(12) United States Patent
Shioya

(10) Patent No.: US 7,588,852 B2
(45) Date of Patent: Sep. 15, 2009

(54) MODULE AND FUEL PACKAGE

(75) Inventor: Masaharu Shioya, Akiruno (JP)

(73) Assignee: Casio Computer Co., Ltd., Tokyo (JP)

( * ) Notice: Subject to any disclaimer, the term of this patent is extended or adjusted under 35 U.S.C. 154(b) by 1091 days.

(21) Appl. No.: 10/910,947

(22) Filed: Aug. 4, 2004

(65) Prior Publication Data

US 2005/0008922 A1 Jan. 13, 2005

Related U.S. Application Data

(63) Continuation of application No. PCT/JP03/15844, filed on Dec. 11, 2003.

(30) Foreign Application Priority Data

Dec. 18, 2002 (JP) ............................. 2002-366009

(51) Int. Cl.
*H01M 2/00* (2006.01)
*H01M 2/02* (2006.01)
(52) U.S. Cl. .......................................... 429/34; 429/19
(58) Field of Classification Search .................. 429/19, 429/34
See application file for complete search history.

(56) References Cited

U.S. PATENT DOCUMENTS 4,562,123 A   12/1985   Shimizu et al.
2002/0081468 A1 *   6/2002   Shioya .......................... 429/19
2002/0106540 A1   8/2002   Shioya
2003/0082427 A1 *   5/2003   Prasad et al. .................. 429/34
2003/0138679 A1 *   7/2003   Prased et al. .................. 429/19
2004/0013927 A1   1/2004   Lawrence et al.

FOREIGN PATENT DOCUMENTS

| EP | 1 329 972 A2 | 7/2003 |
|---|---|---|
| JP | 2000-277139 A | 10/2000 |
| JP | 2002-216832 A | 8/2002 |
| JP | 2002-280035 A | 9/2002 |
| JP | 2003-142135 A | 5/2003 |
| JP | 2003-203660 A | 7/2003 |
| WO | WO 02/099916 A2 | 12/2002 |
| WO | WO 03/073527 A2 | 9/2003 |

* cited by examiner

*Primary Examiner*—Parick Ryan
*Assistant Examiner*—Ben Lewis
(74) *Attorney, Agent, or Firm*—Frishauf, Holtz, Goodman & Chick, P.C.

(57) ABSTRACT

A power generation module for generating electric power by using fuel has a fuel package accommodating portion capable of accommodating a fuel package which has a fuel supply hole and a collection hole having a shape or size different from that of the fuel supply hole, and in which the fuel can be sealed. A fuel supply port can be connected to the fuel supply hole of the fuel package. A collection port having a shape or size different from that of the fuel supply port can be connected to the collection hole of the fuel package. The power generation module further includes a power generator which generates electric power by using fuel supplied from the fuel supply port.

8 Claims, 22 Drawing Sheets

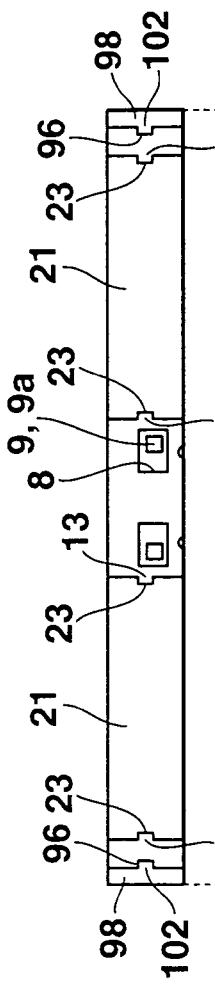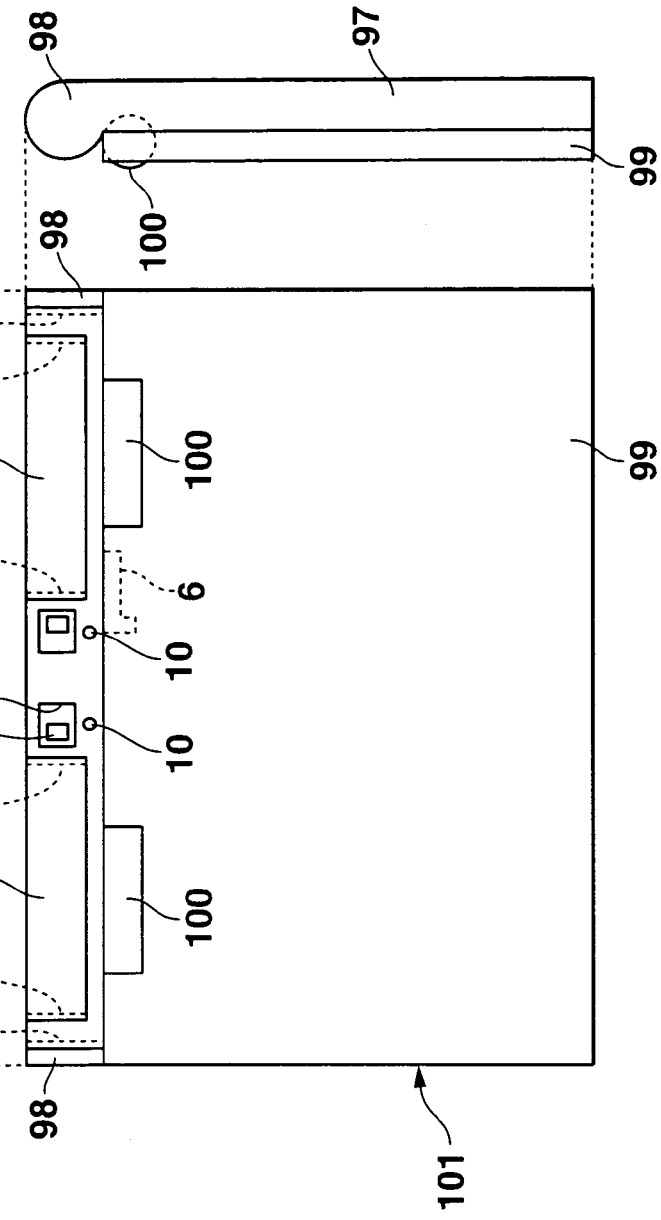

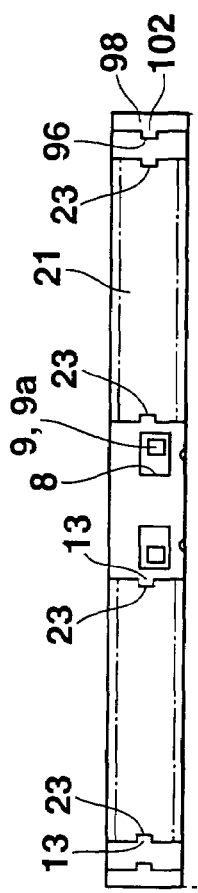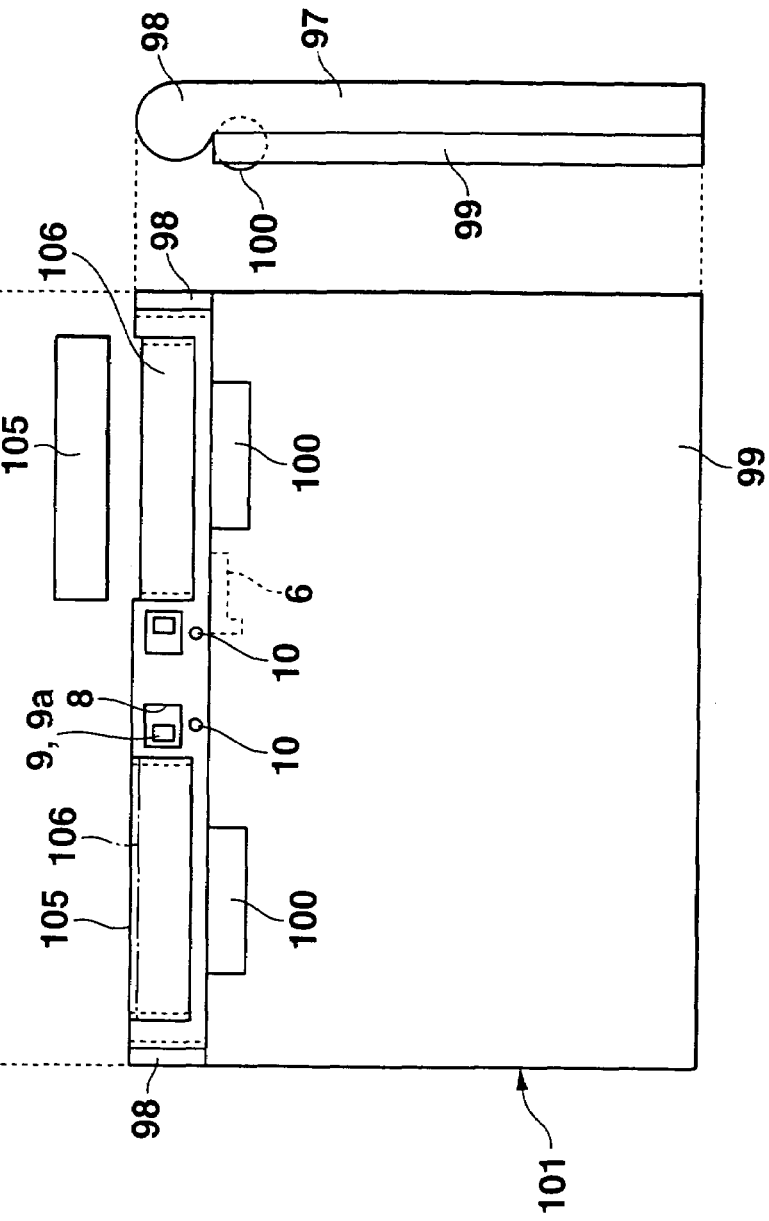

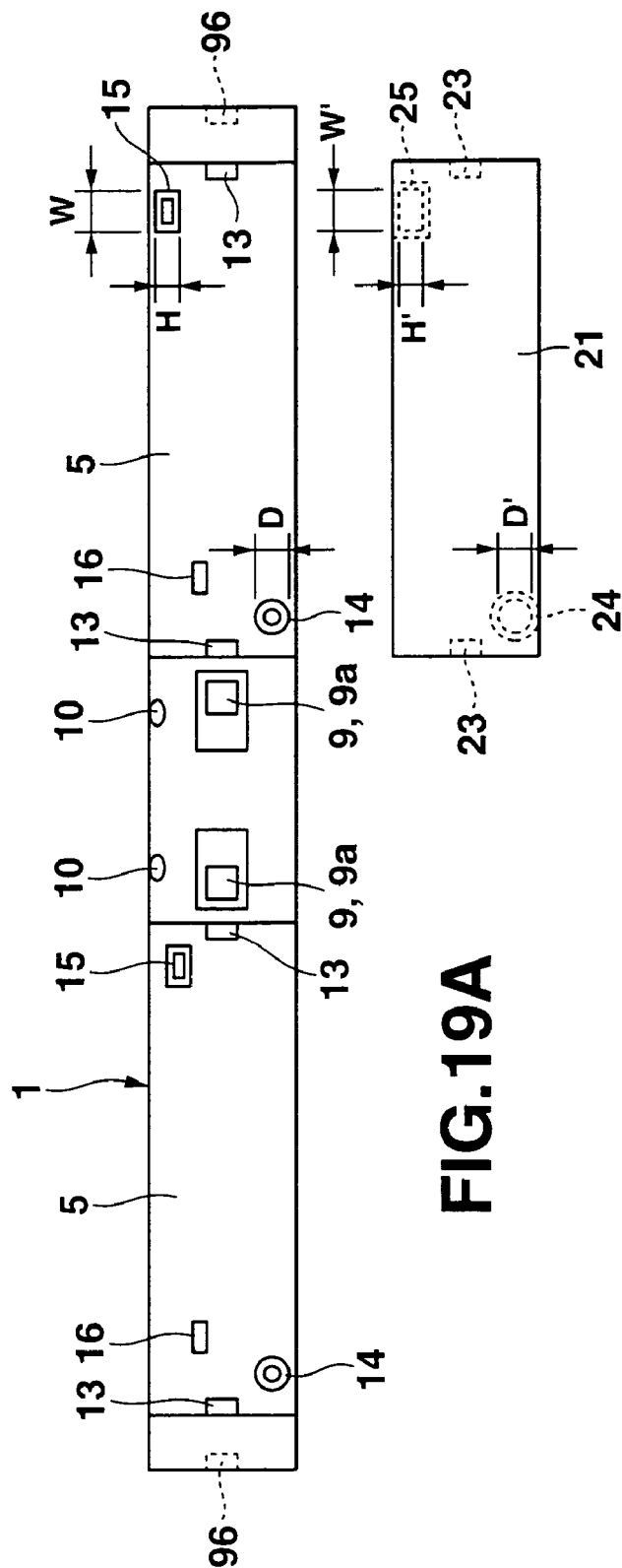

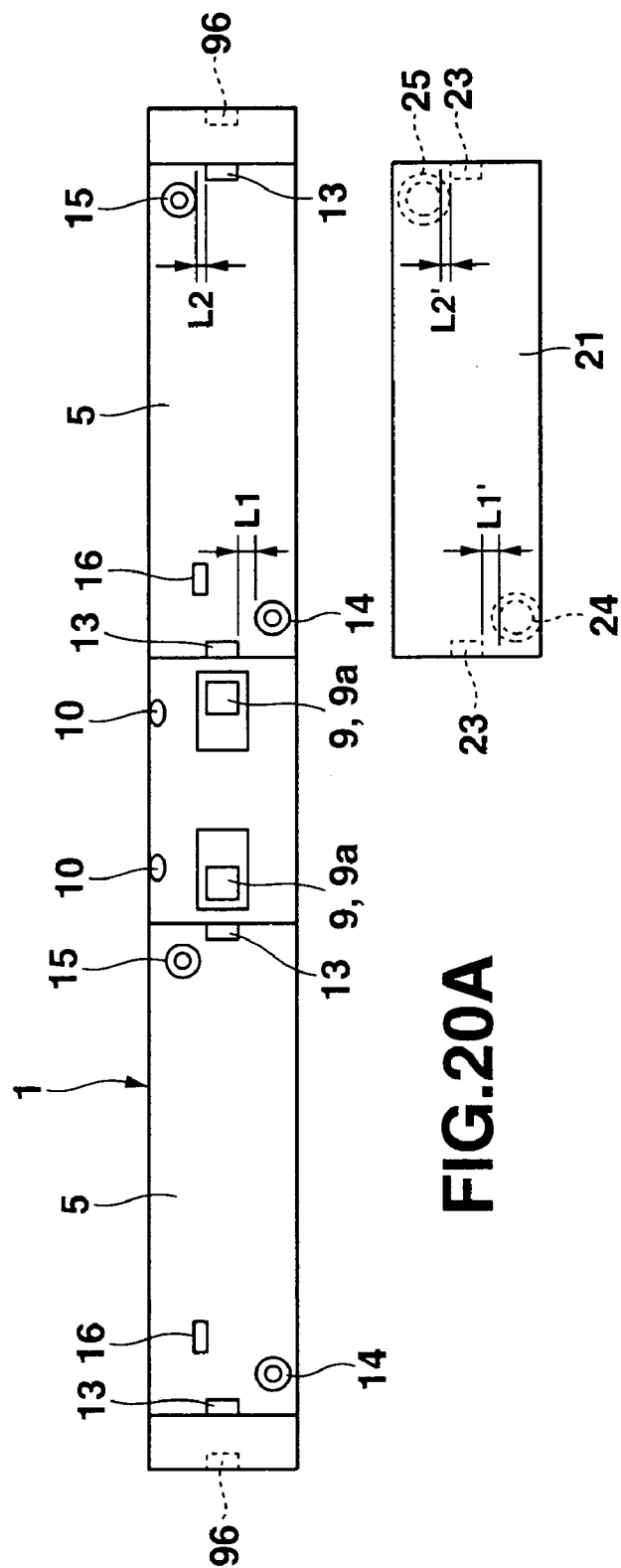

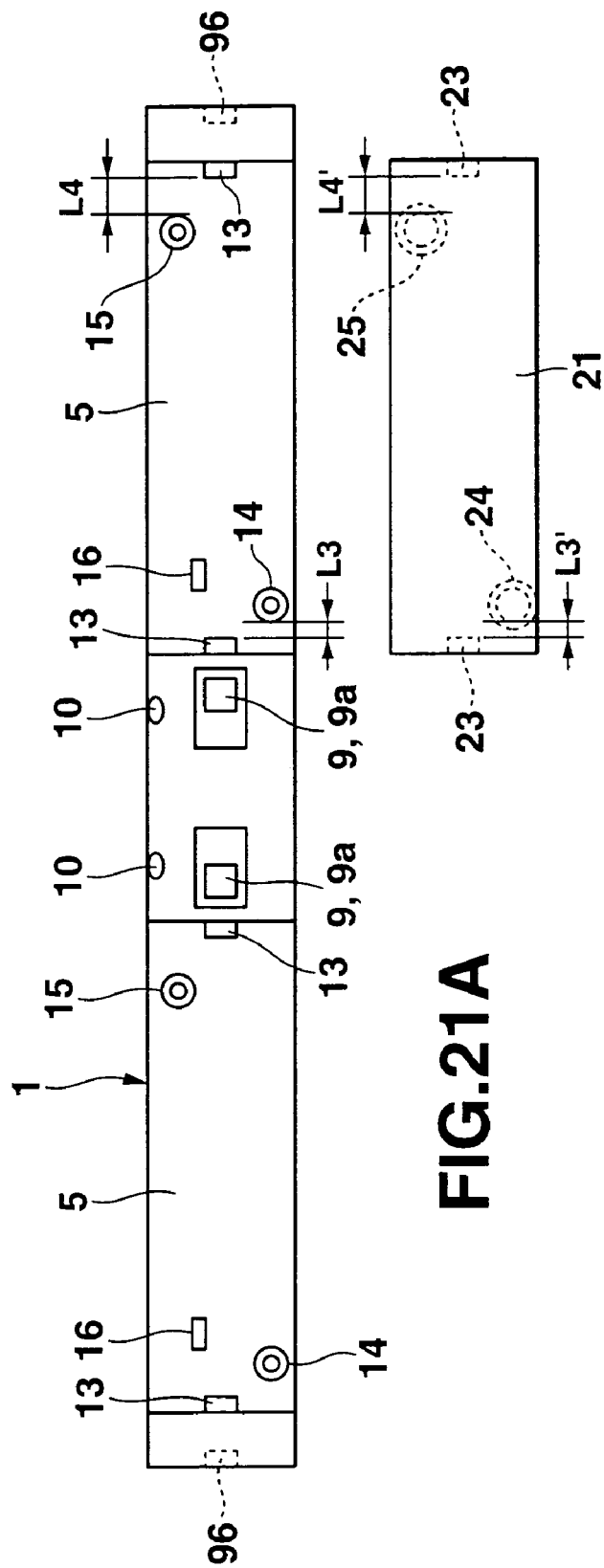

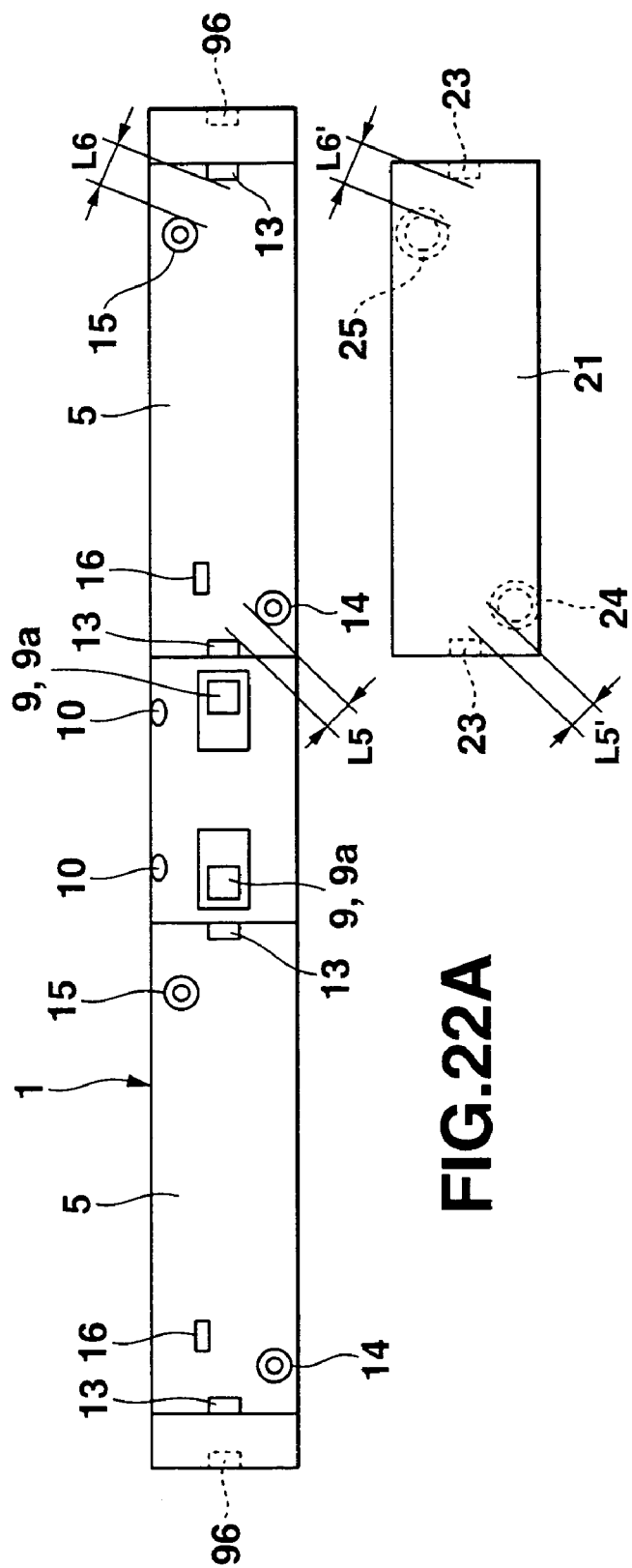

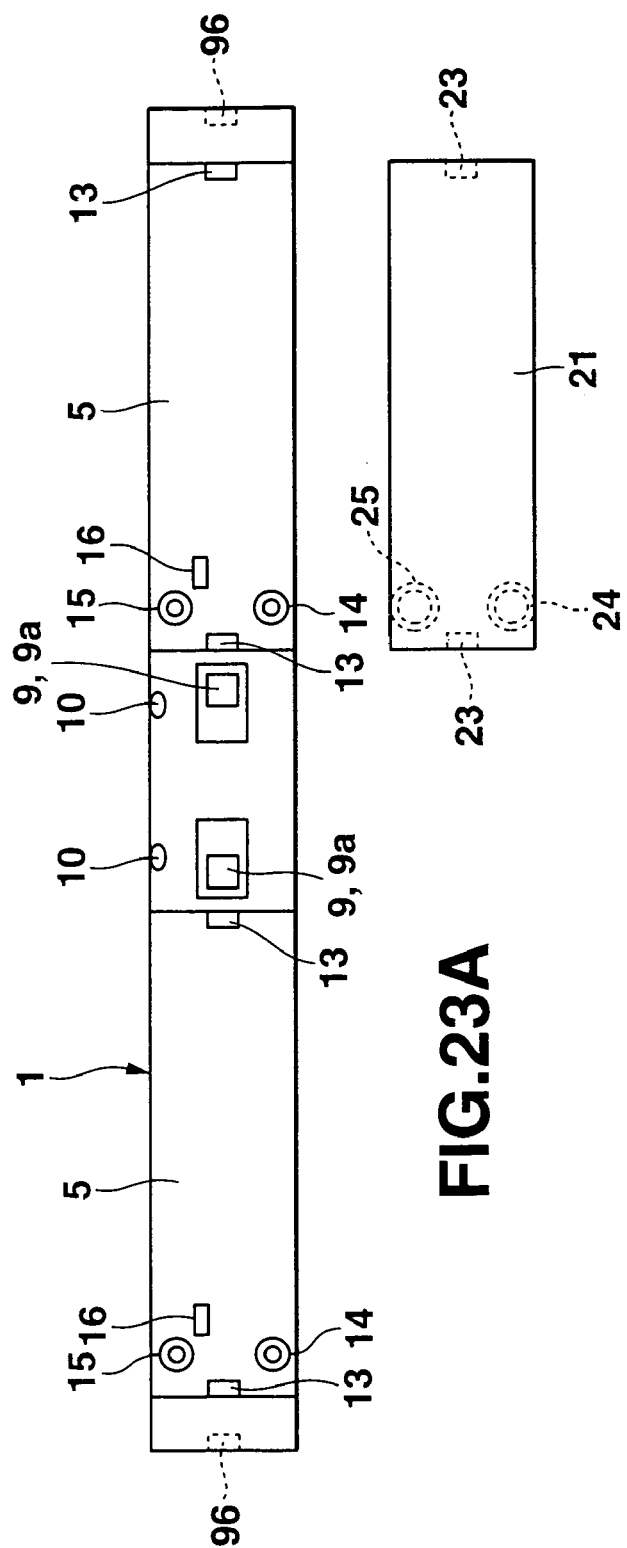

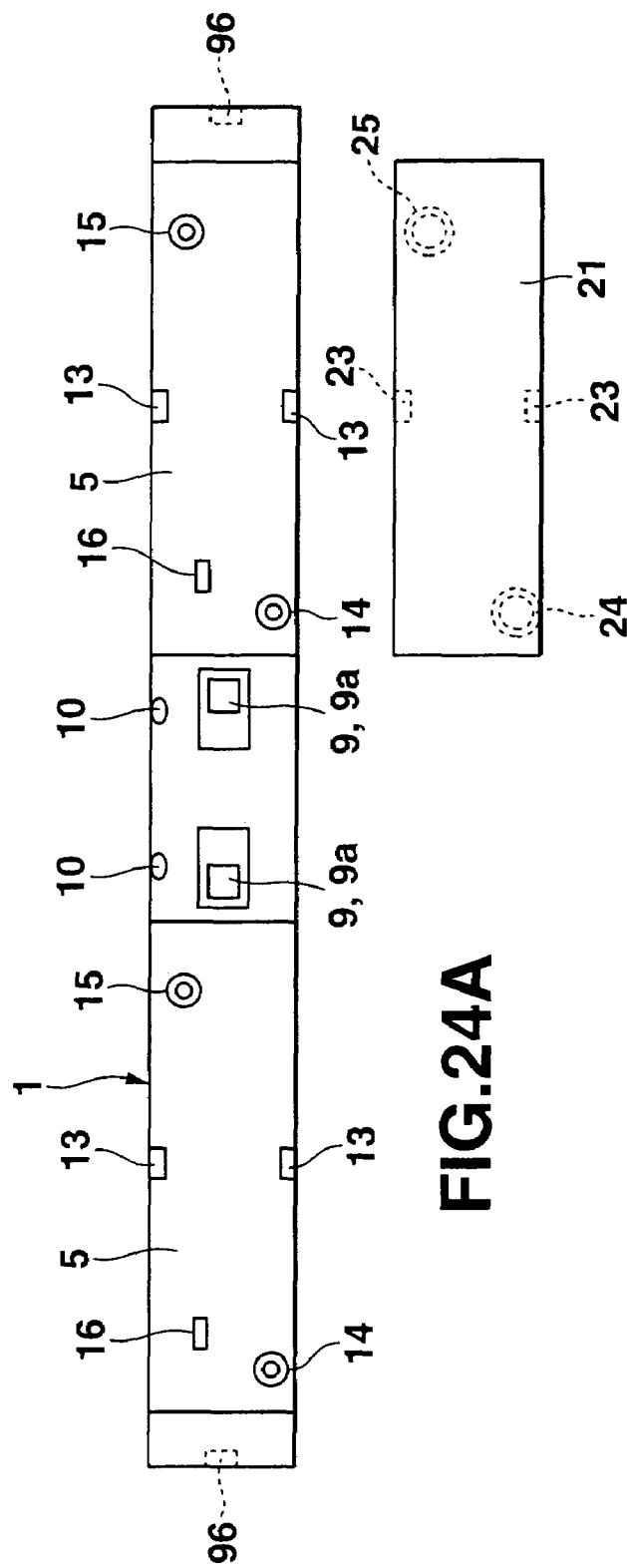

MODULE AND FUEL PACKAGE

CROSS REFERENCE TO RELATED APPLICATIONS

This is a Continuation Application of PCT Application No. PCT/JP03/15844, filed Dec. 11, 2003, which was published under PCT Article 21(2) in English.

This application is based upon and claims the benefit of priority from prior Japanese Patent Application No. 2002-366009, filed Dec. 18, 2002, the entire contents of which are incorporated herein by reference.

BACKGROUND OF THE INVENTION

1. Field of the Invention

The present invention relates to a compact power generation type power supply and an electronic apparatus using the same and, more particularly, to a power generation type power supply for use in a highly portable device and an electronic apparatus using the same.

2. Description of the Related Art

In the technical field of chemical reactions, Jpn. Pat. Appln. KOKAI Publication No. 2000-277139 has proposed, as chemical reaction apparatuses, a fuel reformer for reforming raw fuel such as methane gas, and a fuel cell which generates electric power by using the reformed fuel gas obtained by this fuel reformer.

The use of this conventional chemical reaction apparatus system as a power supply of a small electronic apparatus has not been considered, so downsizing of the chemical reaction apparatus system itself has not been attempted. In particular, when this chemical reaction apparatus system is applied to a highly portable notebook PC, PDA (Personal Digital Assistant), and cellphone, a fuel storage unit containing raw fuel must also be downsized. However, if this fuel storage unit is downsized, it can no longer contain enough fuel to drive the electronic apparatus for long periods, so the electronic apparatus becomes unusable in a short time. This problem can be solved by the use of a replaceable fuel supply means which can be separated from a power generation module for supplying electric power to an electronic apparatus. That is, since an electronic apparatus can be continuously used only by replacing this fuel supply means, it is unnecessary to increase the size of the electronic apparatus itself including the power generation system. Unfortunately, the conventional chemical reaction apparatus system produces water or the like as a byproduct, so this byproduct must be collected from the electronic apparatus and power generation module.

It is an advantage of the present invention to provide a power generation module and fuel supply means by which the fuel supply means can be safely replaced and a byproduct is safely collected.

BRIEF SUMMARY OF THE INVENTION

A power generation module for generating electric power by using fuel according to an aspect of the present invention comprises:

a fuel package accommodating portion capable of accommodating a fuel package which has a fuel supply hole and a collection hole having a shape or size different from that of the fuel supply hole, and in which the fuel is sealed, a fuel supply port capable of connecting to the fuel supply hole of the fuel package, a collection port capable of connecting to the collection hole of the fuel package, and having a shape or size different from that of the fuel supply port, and a power generator which generates electric power by using fuel supplied from the fuel supply port.

A fuel package in which fuel can be sealed according to the present invention comprises:

a fuel supply hole to supply the fuel, and a collection hole having a shape or size different from that of the fuel supply hole.

The invention of this aspect has a structure by which openings for moving the fuel from the fuel package to the power generation module are normally fitted, openings for moving, e.g., a product produced by the power generation module and fuel unreacted in the power generation module from the power generation module to the fuel package are normally fitted, and the openings for moving the fuel from the fuel package to the power generation module and the openings for moving, e.g., the product produced by the power generation module and the fuel unreacted in the power generation module from the power generation module to the fuel package are not fitted by mistake. Therefore, damage to the power generation module can be prevented, and the fuel package can be safely replaced.

A power generation module for generating electric power by using fuel according to another aspect of the present invention comprises:

a fuel package accommodating portion capable of accommodating a fuel package which has a fuel supply hole and collection hole, and in which the fuel can be sealed, a guide portion which guides the fuel package to be accommodated in a predetermined position of the fuel package accommodating portion, a fuel supply port capable of connecting to the fuel supply hole of the fuel package, a collection port capable of connecting to the collection hole of the fuel package, and having a relative distance to the guide portion, which is different from a relative distance between the fuel supply port and guide portion, and a power generator which generates electric power by using fuel supplied from the fuel supply port.

A fuel package in which fuel can be sealed according to still another aspect of the present invention comprises:

a fuel supply hole to supply the fuel to a power generation module;

a collection hole to collect an object to be collected from the power generation module; and a power generation module guide portion which can be accommodated in a fuel package guide portion of the power generation module, and has a relative distance to the fuel supply hole, which is different from a relative distance to the collection hole.

These inventions have a structure by which openings for moving the fuel from the fuel package to the power generation module are normally fitted, openings for moving, e.g., a product produced by the power generation module and fuel unreacted in the power generation module from the power generation module to the fuel package are normally fitted, and the openings for moving the fuel form the fuel package to the power generation module and the openings for moving, e.g., the byproduct produced by the power generation module and the fuel unreacted in the power generation module from the power generation module to the fuel package are not fitted by mistake. Therefore, damage to the power generation module can be prevented, and the fuel package can be safely replaced.

BRIEF DESCRIPTION OF THE SEVERAL VIEWS OF THE DRAWING

FIG. 16A is a side view showing the power generation type portable power supply and a notebook personal computer into which the power generation type portable power supply is inserted, when they are viewed from the side of the power generation type portable power supply, FIG. 16B is a front view showing, from above, the device into which the power generation type portable power supply is inserted, and FIG. 16C is a side view showing, from the side, the device into which the power generation type portable power supply is inserted;

FIG. 18A is a side view showing another power generation type portable power supply and a notebook personal computer into which the power generation type portable power supply is inserted, when they are viewed from the side of the power generation type portable power supply, FIG. 18B is a front view showing, from above, the device into which the power generation type portable power supply is inserted, and FIG. 18C is a side view showing, from the side, the device into which the power generation type portable power supply is inserted;

FIGS. 19A and 19B are front views showing the sizes of a fuel supply port and byproduct collection port of a fuel package accommodating portion, and the sizes of a fuel supply hole 24 and byproduct collection hole 25 of a fuel package;

FIGS. 20A and 20B are front views showing a fuel package accommodating portion and fuel package, respectively, according to another embodiment;

FIGS. 21A and 21B are front views showing a fuel package accommodating portion and fuel package, respectively, according to still another embodiment;

FIGS. 22A and 22B are front views showing a fuel package accommodating portion and fuel package, respectively, according to still another embodiment;

FIGS. 23A and 23B are front views showing a fuel package accommodating portion and fuel package, respectively, according to still another embodiment;

FIGS. 24A and 24B are front views showing a fuel package accommodating portion and fuel package, respectively, according to still another embodiment.

DETAILED DESCRIPTION OF THE INVENTION

Figure 1:
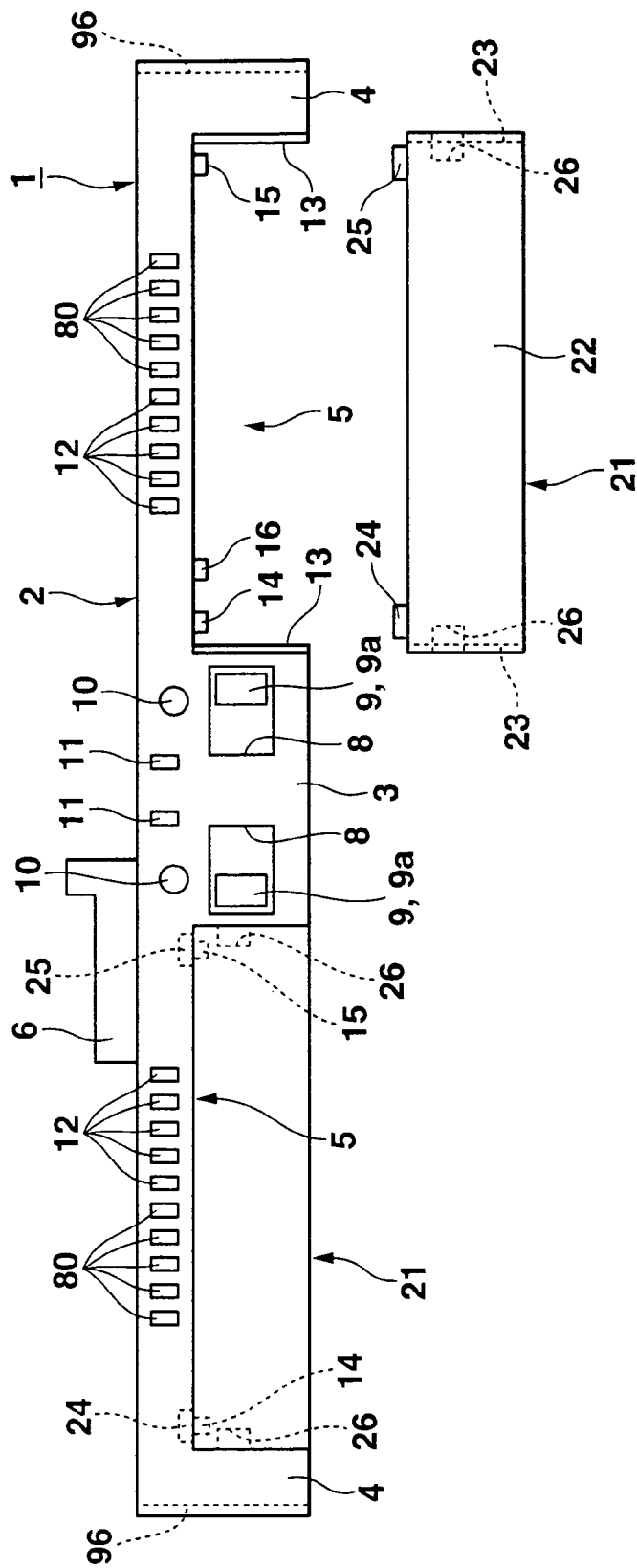
FIG. 1 is a plan view showing the state in which one fuel package is removed from a power generation type portable power supply as an embodiment of the present invention.
Figure 2:
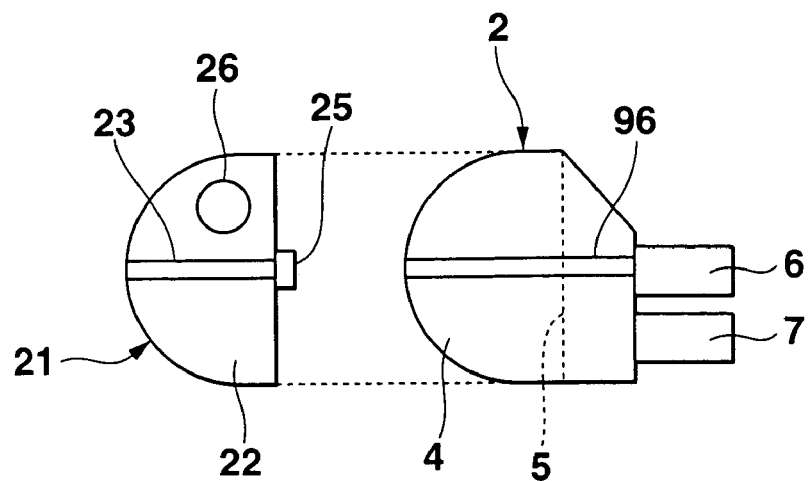
FIG. 2 is a right side view of the power generation type portable power supply shown in FIG. 1.

FIG. 1 is a plan view showing the state in which one fuel package is removed from a power generation type portable power supply as an embodiment of the present invention. FIG. 2 is a right side view of the fuel package and power supply. In this power generation type portable power supply, two fuel packages 21 are attached to one power generation module 1 so as to be detachable independently of each other.

Although details will be described later, the power generation module 1 includes a fuel reforming type polymer electrolyte fuel cell which is a power supply for supplying electric power to an external device. A controller 55 (FIG. 8) in the power generation module 1 generates electric power by using power generation fuel (e.g., fuel which is at least one of hydrogen-containing liquid fuel, liquefied fuel, and gas fuel, and which contains water) supplied from one fuel package 21. If the amount of power generation fuel remaining in the one fuel package 21 becomes insufficient for power generation, the controller 55 automatically switches the fuel packages such that the power generation fuel is supplied not from the one fuel package 21 but from the other fuel package 21.

Figure 17:
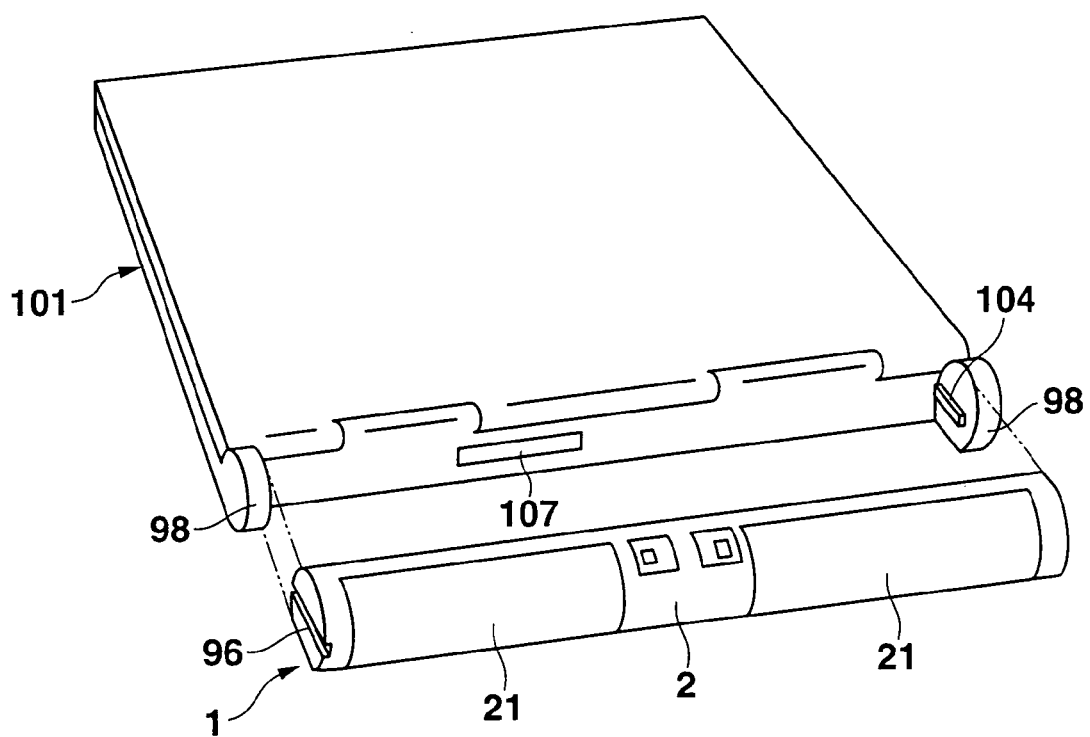
FIG. 17 is a view showing the outer appearances of the power generation type portable power supply and a notebook personal computer of the present invention.

The power generation module 1 has a resin or metal case 2. The case 2 has a substantially rod-like shape when viewed from above, and a substantially semicircular shape when viewed from the side. Fuel package accommodating portions 5 are formed between a central projecting portion 3 formed in a central portion and two end projecting portions 4 formed in the two end portions. On a predetermined portion of the side of the case 2 away from the side in which the fuel package accommodating portions 5 are formed, a positive electrode terminal 6 and negative electrode terminal 7 to be connected to a connector 107 of a portable device 101 such as a notebook personal computer shown in FIG. 17 are formed.

In each of rectangular openings 8 formed in left and right portions of the upper surface of the central projecting portion 3 of the case 2, an operating projection 9a of a fuel package locking slider 9 formed to be movable to the left and right in the opening 8 is placed. A remaining fuel amount indicator lamp 10 is formed near each opening 8 on the upper surface at the root of the central projecting portion 3 of the case 2. Details of the fuel package locking sliders 9 and remaining fuel amount indicator lamps 10 will be explained later.

In the upper surface of the case 2 between the two remaining fuel amount indicator lamps 10, slits 11 for taking in air containing oxygen necessary to oxidize toxic carbon monoxide, which is one of byproducts produced during the course of fuel reforming to be described later, into carbon dioxide are formed in one-to-one correspondence with the fuel package accommodating portions 5. In predetermined portions of the upper surface of the case 2 between the central projecting portion 3 and two end projecting portions 4, a plurality of slits 12 for taking in air containing oxygen necessary for power generation to be described later are separately formed for the two fuel package accommodating portions 5. Also, a plurality of slits 80 for exhausting carbon dioxide produced during the fuel reforming process are separately formed in line with the slits 12 for the two fuel package accommodating portions 5.

The external arrangement of the fuel package 21 will be described below. The fuel package 21 has a hollow semicircular columnar case 22 made of a transparent polymer resin. Guide grooves 23 are formed in predetermined portions of the two side surfaces of the case 22. A fuel supply hole 24 and byproduct supply hole 25 are formed in the flat rear surface of the case 22. In each of the left and right side surfaces of the fuel package 21 shown in FIG. 1, an engaging hole 26 is formed as shown in FIG. 2 (in which the right-side one is shown). The internal arrangement of the fuel package 21 will be explained later.

In each fuel package accommodating portion 5, guide projections or ribs 13 are, in one-to-one correspondence with the guide grooves 23 of the fuel package 21, formed in predetermined portions of those surfaces of the central projecting portion 3 and end projecting portion 4, which oppose each other. Also, in each fuel package accommodating portion 5, a fuel supply port 14 and byproduct collection port 15 are, in one-to-one correspondence with the fuel supply hole 24 and byproduct collection hole 25, respectively, of the fuel package 21, formed in predetermined portions of the two sides of the case 2 between the central projecting portion 3 and end projecting portion 4.

The two fuel packages 21 have substantially the same structure. In each of the two fuel package accommodating portions 5 of the case 2, the fuel supply port 14 is positioned on the left side, and the byproduct collection port 15 is positioned on the right side. Therefore, each fuel package 21 can be accommodated in either the left or right fuel package accommodating portion 5. In addition, the fitting shapes of the fuel supply port 14 and byproduct collection port 15 are different, and the fitting shapes of the fuel supply hole 24 and byproduct collection hole 25 are also different. Accordingly, the fuel supply hole 24 cannot be fitted on the byproduct collection port 15 by mistake, and the byproduct collection hole 25 cannot be fitted on the fuel supply port 14 by mistake. As described above, the fuel packages 21 are of the same type, and the two fuel package accommodating portions 5 have the same positional relationship between the fuel supply port 14 and byproduct collection port 15. Therefore, the user need not remember different ways of accommodation for the left and right fuel package accommodating portions 5, and will not accommodate the fuel package 21 upside down by mistake. In a predetermined portion of the case 2 near each fuel supply port 14, a switch 16 for detecting that the fuel package 21 is accommodated in the fuel package accommodating portion 5 is formed. When the fuel package 21 is accommodated in the fuel package accommodating portion 5, the switch 16 collapses as it is pressed by the fuel package 21, thereby notifying the controller 55 that the fuel package 21 is accommodated in the fuel package accommodating portion 5. When the fuel package 21 is removed from the fuel package accommodating portion 5, the switch 16 is restored to its original position by the restoring force of an internal spring or the like, thereby notifying the controller 55 that the fuel package 21 is removed from the fuel package accommodating portion 5. The switch 16 has this switch structure.

Figure 3:
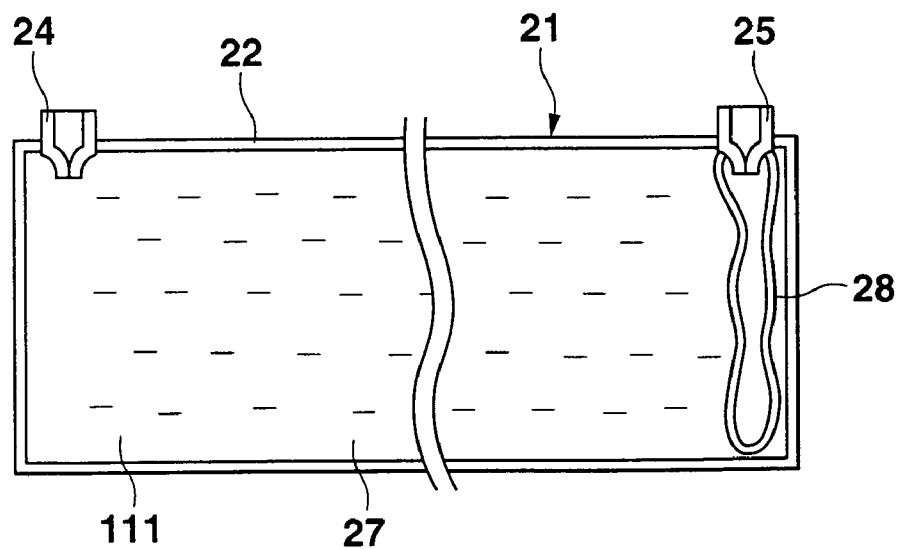
FIG. 3 is a cross-sectional view of the fuel package.

FIG. 3 is a cross-sectional view of the fuel package 21 in the initial state. In the case 22, power generation fuel 111 made of, e.g., an aqueous methanol solution is sealed. This portion in which the fuel 111 is sealed will be referred to as a fuel sealed portion 27 hereinafter. In the case 22, a byproduct collecting unit 28 made of a transparent flexible polymer resin is attached inside the byproduct collection hole 25. Although not shown, a certain amount of, e.g., a red dye is sealed in the byproduct collecting unit 28. As will be described later, the case 22 and byproduct collecting unit 28 are transparent in order to allow external optical detection of the remaining amount of the fuel 111 in the fuel sealed portion 27.

Figure 4:
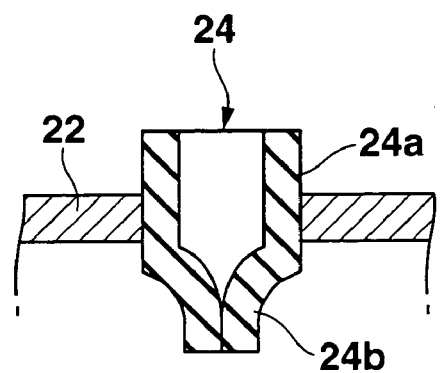
FIG. 4 is a sectional view of a fuel supply port of the fuel package.

As shown in FIG. 4, the fuel supply hole 24 has, e.g., a check valve structure in which an elastically deformable variable valve 24b is attached to the distal end of a cylinder 24a. When the fuel package 21 is not accommodated in the fuel package accommodating portion 5 of the power generation module 1, the fuel supply hole 24 is closed by the elastic restoring force of the variable valve 24b and by that internal pressure of the fuel 111 sealed in the case 22, which is higher than the atmospheric pressure. The byproduct collection hole 25 also has a check valve structure similar to but different in shape from that of the fuel supply hole 24, i.e., also has a cylinder and variable valve.

Figure 5:
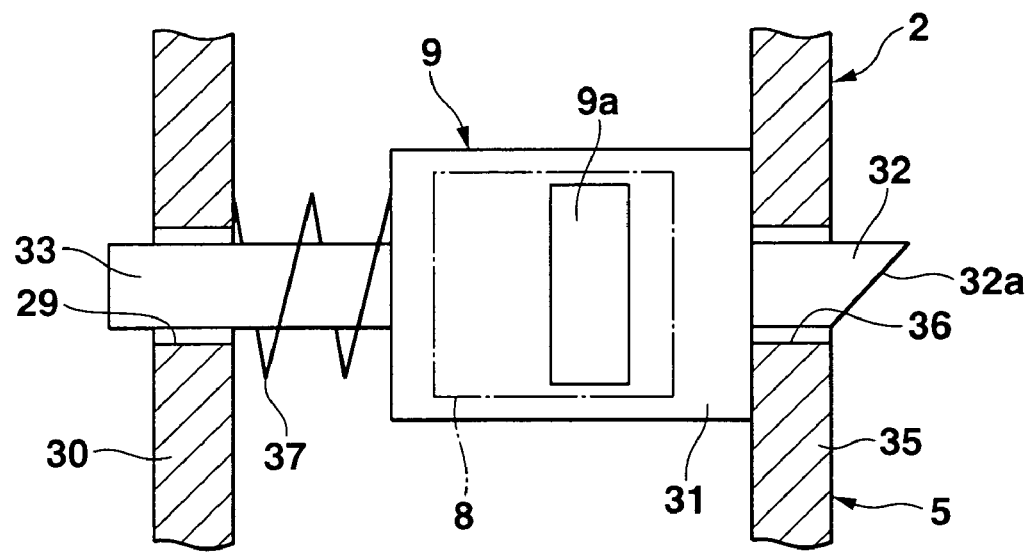
FIG. 5 is a cross-sectional view of a fuel package locking slider.
Figure 6:
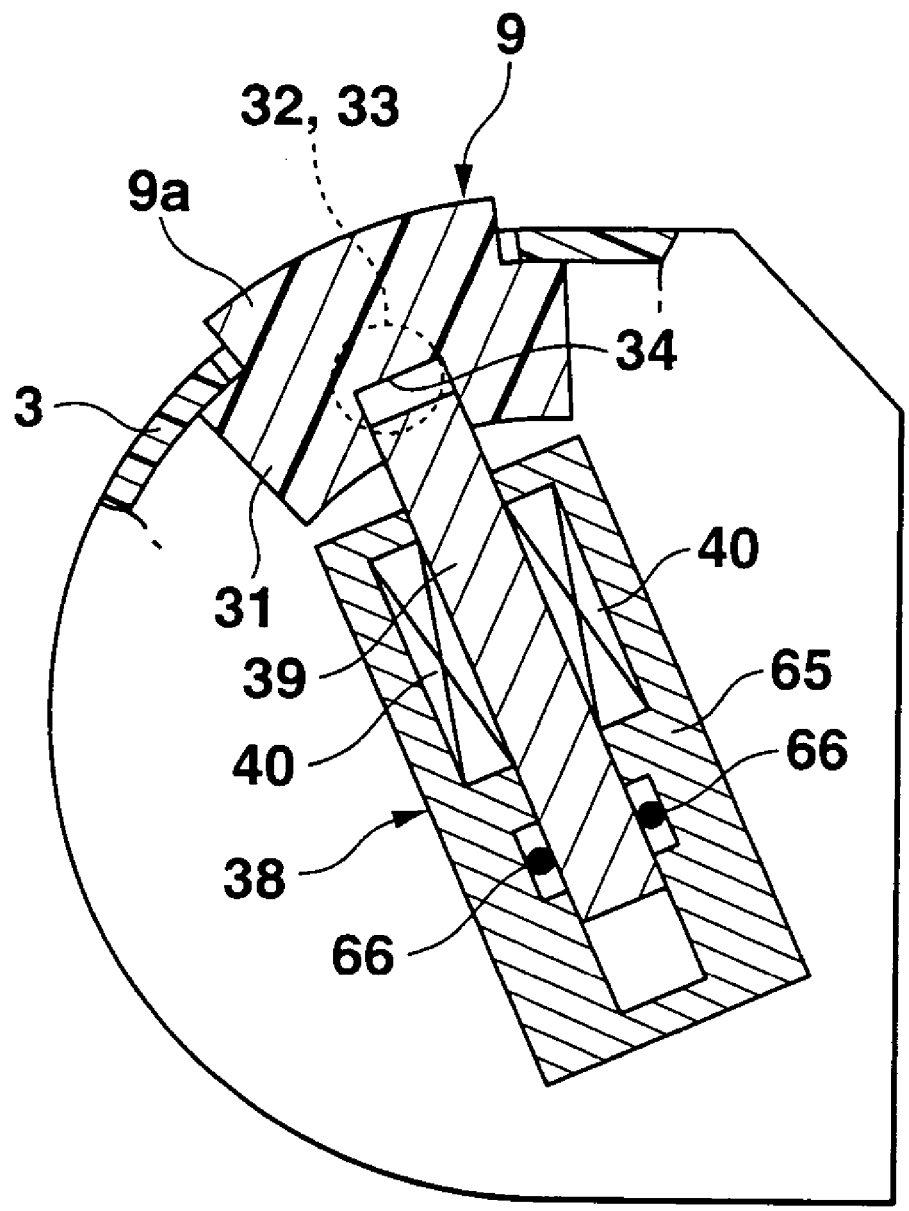
FIG. 6 is a longitudinal right side sectional view of the fuel package locking slider.

FIG. 5 is a cross-sectional view of the fuel package locking slider 9 on the right side of FIG. 1, showing the state in which the fuel package 21 is accommodated in the fuel package accommodating portion 5 of the power generation module 1 and automatically locked so as not to be removed from the power generation module 1. FIG. 6 is a longitudinal sectional view (a sectional view in the longitudinal direction) of the same portion in the automatically locked state. The fuel package locking slider 9 has the operating projection 9a exposed to the upper surface of the central projecting portion 3, and has a slider main body 31 inside the central projecting portion 3. An engaging projection 32 having an inclined end face 32a is formed on that side surface of the slider main body 31, which faces a support portion 35 as one side portion of the fuel package accommodating portion 5. A shaft 33 is formed on the other side surface of the slider main body 31. The end portion of the shaft 33 is inserted horizontally movably into a through hole 29 formed in a shaft support portion 30 in the central projecting portion 3.

When the fuel package 21 is accommodated in the fuel package accommodating portion 5 of the power generation module 1, the switch 16 is pressed by the fuel package 21, so the controller 55 detects that the fuel package 21 is normally accommodated in the fuel package accommodating portion 5, and determines that the fuel 111 can be reformed by a fuel evaporator 44, fuel reformer 45, and CO eliminator 46 (to be described later). If the controller 55 determines that power generation by a power generator 50 including a fuel cell is necessary because the charge amount of a charger 51 is small, the controller 55 controls so that the fuel package locking slider 9 is biased to the right by the force of a spring wound around the shaft 33 between the slider main body 31 and the shaft support portion 30 on the left side, thereby bringing the slider main body 31 in contact with the support portion 35, and also commands the fuel evaporator 44, fuel reformer 45, and CO eliminator 46 to reform the fuel 111. In this state, the inclined end face 32a of the engaging projection 32 projects into the fuel package accommodating portion 5 outside the support portion 35. One of the engaging holes 26 of the fuel package 21 is hooked by the engaging projection 32 to fix the fuel package 21 to the fuel package accommodating portion 5 of the power generation module 1.

An engaging hole 34 is formed in the lower surface of the slider main body 31, and an electromagnetic solenoid 38 is placed below this lower surface. The electromagnetic solenoid 38 has a cylindrical rod 39, a plunger 40 covering the circumferential surface of a central portion of the rod 39 and containing a permanent magnet and electromagnetic force coil, and a support portion 65 which supports the plunger 40 and allows the rod 39 to smoothly move in the longitudinal direction via a linear ball bearing 66. When the controller 55 in the power generation module 1, which senses the automatically locked state as will be described later controls the electromagnetic force coil in the plunger 40, the distal end portion of the rod 39 of the electromagnetic solenoid 38 positioned in a predetermined portion of the case 2 moves in a direction perpendicular to the sliding direction (lateral direction) of the engaging projection 32 and enters the engaging hole 34 of the fuel package locking slider 9, thereby fixing the fuel package locking slider 9 so as to prevent its sliding in the lateral direction. If the fuel package 21 is not accommodated in the fuel package accommodating portion 5, the controller 55 in the power generation module 1 senses this state, and the distal end portion of the rod 39 of the electromagnetic solenoid 38 leaves the engaging hole 34 of the fuel package locking slider 9, thereby making the fuel package locking slider 9 freely slidable.

As an example, a case in which the right fuel package 21 is to be accommodated in the right fuel package accommodating portion 5 of the power generation module 1 will be explained below. In the initial state in which the fuel package 21 is not accommodated in the fuel package accommodating portion 5, i.e., in the state in which the switch 16 is not pressed by the fuel package 21, the distal end portion of the rod 39 of the electromagnetic solenoid 38 has been moved outside the engaging hole 34 of the fuel package locking slider 9 by the controller 55. Therefore, the fuel package locking slider 9 can freely slide. After that, when the fuel package 21 is accommodated in the fuel package accommodating portion 5 by guiding the guide grooves 23 of the fuel package 21 along the guide projections 13, the inclined end face 32a of the engaging projection 32 of the fuel package locking slider 9 is pushed by the left side surface of the fuel package 21 to move the fuel package locking slider 9 to the left against the force of the coil spring 37, thereby permitting the fuel package 21 to be accommodated in the fuel package accommodating portion 5.

When the fuel package 21 is accommodated in the fuel package accommodating portion 5, the fuel package locking slider 9 is biased to the right by the coil spring 37, and the inclined end face 32a of the engaging projection 32 is inserted into a predetermined one of the engaging holes 26 of the fuel package 21. In this state, therefore, the fuel package 21 is locked in the accommodating position in the fuel package accommodating portion 5.

When the fuel package 21 is thus normally accommodated in the fuel package accommodating portion 5, the controller 55 senses that the switch 16 is pushed by the fuel package 21, and determines that the fuel 111 can be reformed by the fuel evaporator 44, fuel reformer 45, and CO eliminator 46. If the controller 55 determines that power generation by the power generator 50 including a fuel cell is necessary because the charge amount of the charger 51 is small, the rod 39 of the electromagnetic solenoid 38 is inserted into the engaging hole 34 of the fuel package locking slider 9. Accordingly, the engaging projection 32 of the fuel package locking slider 9 on the side on which the fuel package 21 is accommodated engages with one engaging hole 26 of the fuel package 21 through the through hole 36, and the fuel package locking slider 9 is locked so as not to slide while the fuel package 21 is kept fixed to the fuel package accommodating portion 5 of the power generation module 1. After that, the fuel evaporator 44, fuel reformer 45, and CO eliminator 46 start reforming the fuel 111.

The auto-lock control described above is an explanation pertaining to the right fuel package accommodating portion 5. However, the left fuel package accommodating portion 5 of the power generation module 1 of course includes a mechanism which achieves the same function and operation. Also, the fuel package locking slider 9, the operating projection 9a, and the related peripheral locking mechanism structure on the left side are mirror images of those on the right side shown in FIG. 5.

The fuel package locking slider 9 is locked by the electromagnetic solenoid 38 in the position at which the fuel package 21 is locked as described above in order to prevent removal of the fuel package 21 by mistake during the period from the reforming operation to the power generating operation, i.e., while at least one of the fuel evaporator 44, fuel reformer 45, CO eliminator 46, and power generator 50 is in operation, or while the power generation fuel 111 is supplied from the fuel package 21 to the power generation module 1, thereby preventing an accident in which the power generating operation is abnormally stopped.

Figures 7A, 7B:
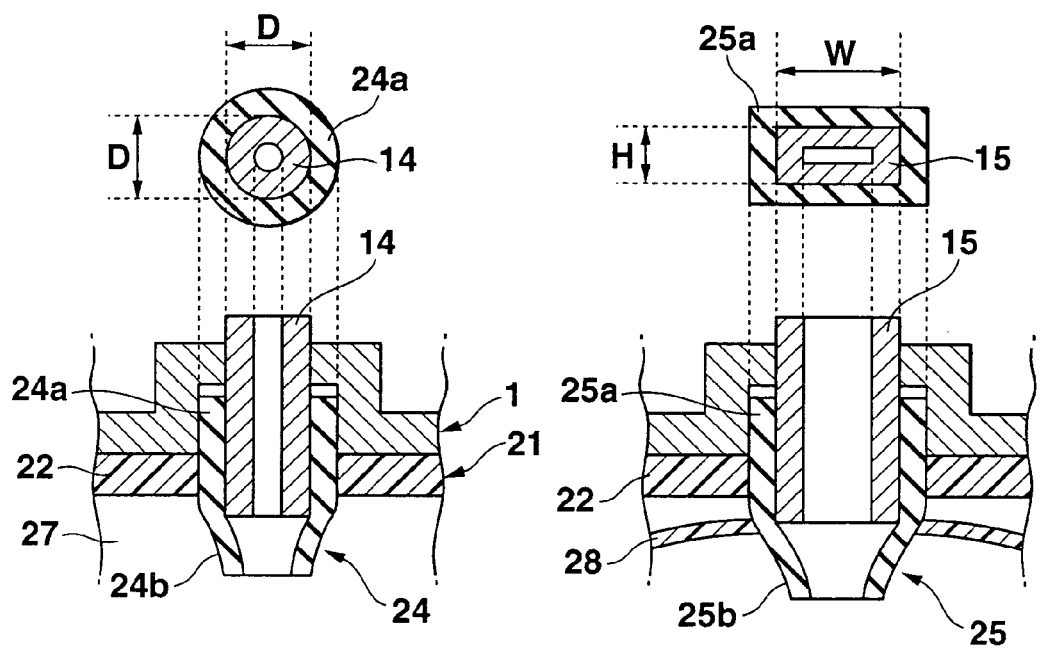
FIGS. 7A and 7B are cross-sectional views each showing a portion of the state in which the fuel package is accommodated in a fuel package accommodating portion.

FIG. 7A shows a longitudinal section and a cross section (a section cut in the lateral direction) when the cylindrical fuel supply port 14 is inserted into the cylindrical member 24a of the fuel supply hole 24 with the fuel package 21 accommodated in the fuel package accommodating portion 5. FIG. 7B shows a longitudinal section and cross section when the pipe-like byproduct collection port 15 having a rectangular longitudinal section outer shape is inserted into a pipe member 25a having a rectangular longitudinal section inner shape of the byproduct collection hole 25 with the fuel package 21 accommodated in the fuel package accommodating portion 5. In this case, the variable valve 24b of the fuel supply hole 24 is pressed by the distal end portion of the fuel supply port 14 and elastically deforms, and this allows the fuel supply port 14 to communicate with the fuel sealed portion 27. Likewise, a variable valve 25b of the byproduct collection hole 25 is pressed by the distal end portion of the byproduct collection port 15 and elastically deforms, and this allows the byproduct collection port 15 to communicate with the byproduct collecting portion 28.

The longitudinal section inner shape of the cylindrical member 24a differs from the longitudinal section outer shape of the byproduct collection port 15, and the longitudinal section inner shape of the pipe member 25a differs from the longitudinal section outer shape of the fuel supply port 14. Since a diameter D of the longitudinal section outer shape of the fuel supply port 14 is larger than a height H of the longitudinal section inner shape of the pipe member 25a, the fuel supply port 14 cannot be inserted into the pipe member 25a. Since a width W of the longitudinal section outer shape of the byproduct collection port 15 is larger than a diameter D of the longitudinal section inner shape of the cylindrical member 24a, the byproduct collection port 15 cannot be inserted into the cylindrical member 24a. Accordingly, the fuel supply hole 24 and byproduct collection hole 25 of the fuel package 21 cannot be fitted on the byproduct collection port 15 and fuel supply port 14, respectively, by mistake.

As described above, the fuel supply port 14 and byproduct collection port 15 of the fuel package 21 have different shapes, and the shapes of the cylindrical member 24a of the fuel supply hole 24 and the pipe member 25a of the byproduct collection hole 25 are also made different from each other in accordance with the fuel package 21. This makes it possible to prevent the fuel package 21 from being inserted upside down.

The remaining fuel amount indicator lamp 10 will be explained below. Referring to FIG. 1, the right remaining fuel amount indicator lamp 10 corresponds to the fuel package 21 accommodated in the right fuel package accommodating portion 5, and the left remaining fuel amount indicator lamp 10 corresponds to the fuel package 21 accommodated in the left fuel package accommodating portion 5.

Each remaining fuel amount indicator lamp 10 is OFF when the fuel package 21 is not accommodated in the fuel package accommodating portion 5, i.e., when the switch 16 is not pushed against the fuel package 21. The remaining fuel amount indicator lamp 10 emits green light when the remaining amount of the fuel 111 in the fuel sealed portion 27 of the fuel package 21 accommodated in the fuel package accommodating portion 5 is sufficient for power generation, and emits red light when the remaining amount of the fuel 111 in the fuel sealed portion 27 of the fuel package 21 accommodated in the fuel package accommodating portion 5 is insufficient for power generation. The power generation module 1 may also have a function of outputting this remaining fuel amount data to the device 101 which is operated by the electric power of the power generation module 1. When this is the case, the power generation module 1 is equipped with a terminal for outputting the remaining fuel amount data to the device 101, in addition to the positive electrode terminal 6 and negative electrode terminal 7, and the device 101 is equipped with an indicator for indicating the remaining amount of each fuel package 21. This allows an operator operating the device 101 to recognize the replacement timing of the fuel package 21 without checking the remaining fuel amount indicator lamp 10 of the power generation module 1. The remaining amount data can be binary data indicating whether the remaining amount of the fuel 111 in the fuel sealed portion 27 of the fuel package 21 is sufficient for power generation. This remaining amount data may also be classified into multiple stages of, e.g., 75% or more, 50% (inclusive) to 75% (exclusive), equal to or larger than the amount necessary for power generation and less than 50%, and less than the amount necessary for power generation. Since the device 101 finely indicates the remaining amount in accordance with this data, an operator can operate the device 101 while readily predicting the replacement timing of the fuel package 21. Detection of the remaining amount of fuel in the fuel sealed portion 27 of the fuel package 21 accommodated in the fuel package accommodating portion 5 will be described later.

Figure 8:
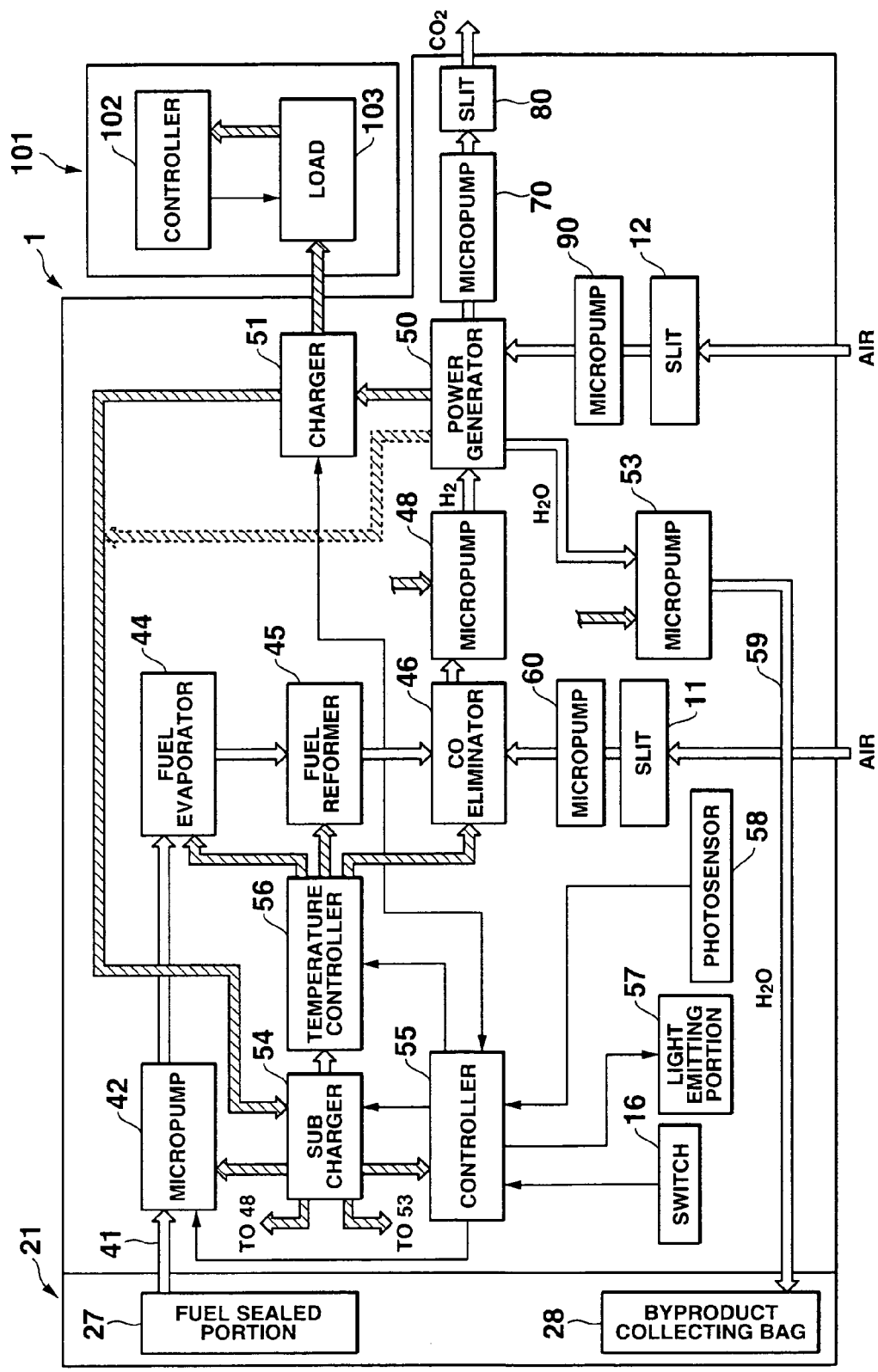
FIG. 8 is a block diagram showing the main parts of a power generation module and the fuel package and the main parts of a device to be driven by the power generation module.

FIG. 8 is a block diagram showing the main parts of the power generation module 1 and fuel package 21 and the main components of the device 101 such as a notebook personal computer driven by the power generation module 1. FIG. 8 shows only one of each pair of components such as the fuel packages 21. The device 101 includes a controller 102 and a load 103 controlled by the controller 102.

Figure 9:
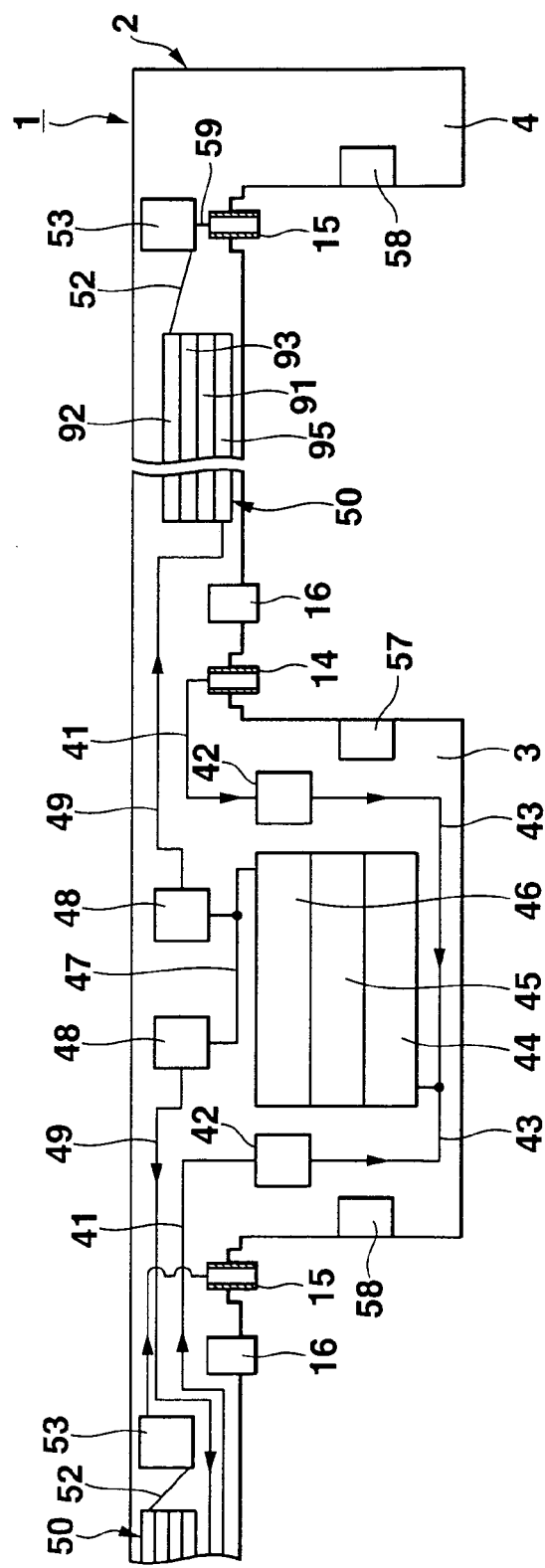
FIG. 9 is a plan view showing an outline of the internal arrangement of a case of the power generation module.

FIG. 9 is a plan view showing an outline of the inner arrangement of the case 2 of the power generation module 1. First, the central portion of the case 2 and its vicinity will be explained below. Each fuel supply port 14 is connected to the inlet of a micropump (fuel flow controller) 42 via a flow path 41. The outlet of the micropump 42 is connected through a flow path 43 to the fuel evaporator 44 which is a small reactor called a micro chemical reactor. The controller 55 operates one of the two micropumps 42 so as to supply the fuel 111 from only one fuel package 21. The fuel evaporator 44 heats and vaporizes the fuel 111 made of an aqueous ethanol solution supplied from the fuel package 21, by using a thin film heater 63 (to be described later) under the control of the controller 55.

The outlet of the fuel evaporator 44 is connected to the inlet of the fuel reformer 45 which is a micro chemical reactor. The fuel reformer 45 reforms the vaporized fuel supplied from the fuel evaporator 44 and produces hydrogen, carbon dioxide as a byproduct, and a slight amount of carbon monoxide.

The outlet of the fuel reformer 45 is connected to the inlet of the CO (carbon monoxide) eliminator 46 which is a micro chemical reactor. The CO eliminator 46 as the micro chemical reactor causes carbon monoxide contained in hydrogen supplied from the fuel reformer 45 to react with that atmospheric oxygen outside the power generation module 1, which is taken in through the slit 11 by a micropump 60, thereby producing carbon dioxide.

The outlet of the CO eliminator 46 is connected to the inlets of two micropumps 48 through a flow path 47. The outlet of each micropump 48 is connected to the inlet of the power generator 50 through a flow path 49. The controller 55 operates one or both of the two micropumps 48 in accordance with the charge amount of the charger 51, thereby starting power generation of the power generator 50. Each power generator 50 is formed inside that portion of the case 2, which corresponds to the fuel package accommodating portion 5. The power generator 50 receives hydrogen supplied from the CO eliminator 46, generates electric power by using this hydrogen and oxygen taken in through the slits 12, supplies the generated electric power to the charger 51, and discharges produced water 112 into a space 87. A practical structure will be described later.

The space 87 is connected to a flow path 52, the flow path 52 is coupled with a micropump 53, and the lower end of the flow path 52 is connected to the inlet of the micropump 53. The outlet of the micropump 53 is connected to the byproduct collection port 15 through a flow path 59. Accordingly, with the fuel package 21 accommodated in the fuel package accommodating portion 5, the outlet of the micropump 53 is connected to the byproduct collecting portion 28 via the byproduct collection port 15 and byproduct collection hole 25. When the switch 16 of the right fuel package accommodating portion 5 is not pressed, i.e., when the fuel package 21 is not accommodated in the right fuel package accommodating portion 5, the controller 55 stops the operation of the right micropump 42. When the switch 16 of the left fuel package accommodating portion 5 is not pressed, i.e., when the fuel package 21 is not accommodated in the left fuel package accommodating portion 5, the controller 55 stops the operation of the left micropump 42.

A micropump 90 feeds oxygen supplied from the slits 12 to the space 87 under the control of the controller 55.

The charger 51 is formed inside the central portion of the case 2. The charger 51 has a secondary battery such as a capacitor which is charged by receiving the supply of generated power from the power generator 50. The charger 51 supplies the charged electric power to a sub-charger 54, and to the load 103 and controller 102 of the device 101.

The sub-charger 54 is formed inside the central portion of the case 2. The sub-charger 54 has a secondary battery such as a capacitor which is charged by receiving the supply of electric power from the charger 51 or power generator 50. The sub-charger 54 outputs necessary electric power to the micropumps 42, 48, and 53, micropumps 60, 70, and 90, the controller 55, a temperature controller 56, a light-emitting portion 57, and the remaining fuel amount indicator lamp 10.

The controller 55 is formed inside the central portion of the case 2. The controller 55 controls all driving operations in the power generation module 1. The temperature controller 56 is formed inside the central portion of the case 2. The temperature controller 56 controls the fuel evaporator 44, fuel reformer 45, and CO eliminator 46 so that their temperatures are appropriate temperatures, and sometimes controls the temperature of the power generator 50.

The light-emitting portions 57 are formed in that surface of the left end projecting portion 4, which is exposed to the fuel package accommodating portion 5, and in that surface on the right side of the central projecting portion 3 of the case 2, which is exposed to the fuel package accommodating portion 5. Photosensors 58 are formed in that surface on the left side of the central projecting portion 3, which is exposed to the fuel package accommodating portion 5, and in that surface of the right end projecting portion 4, which is exposed to the fuel package accommodating portion 5, where the photosensors 58 oppose the light-emitting portions 57. As will be described later, the light-emitting portion 57 and photosensor 58 optically sense, from outside the fuel package 21, the remaining amount of the fuel 111 in the fuel sealed portion 27 of the fuel package 21 accommodated in the fuel package accommodating portion 5.

The power generating operation of this power generation type portable power supply will be described below. Assume, as described above, that the fuel packages 21 are accommodated in the two fuel package accommodating portions 5 of the power generation module 1 and locked by the fuel package locking sliders 9, and that the fuel package locking sliders 9 are locked by the electromagnetic solenoids 38. Consequently, the switches 16 are pushed and turned on by the fuel packages 21.

When the switches 16 are turned on, the controller 55 determines that the fuel packages 21 are accommodated in the fuel package accommodating portions 5, and receives sense signals from the light-emitting portions 57 and photosensors 58. In order to supply the fuel 111 only from that one of the two fuel packages 21, which is found to have a remaining fuel amount smaller than that of the other and still sufficient for power generation, the controller 55 outputs a command signal for supplying driving power to the micropump 42 which communicates with the fuel package 21 having the smaller amount of the fuel 111, and supplying no driving power to the micropump 42 which communicates with the fuel package 21 having a larger amount of the fuel 111, so as to drive the micropump 42 which communicates with the fuel package 21 having the smaller amount of the fuel 111.

Figure 10:
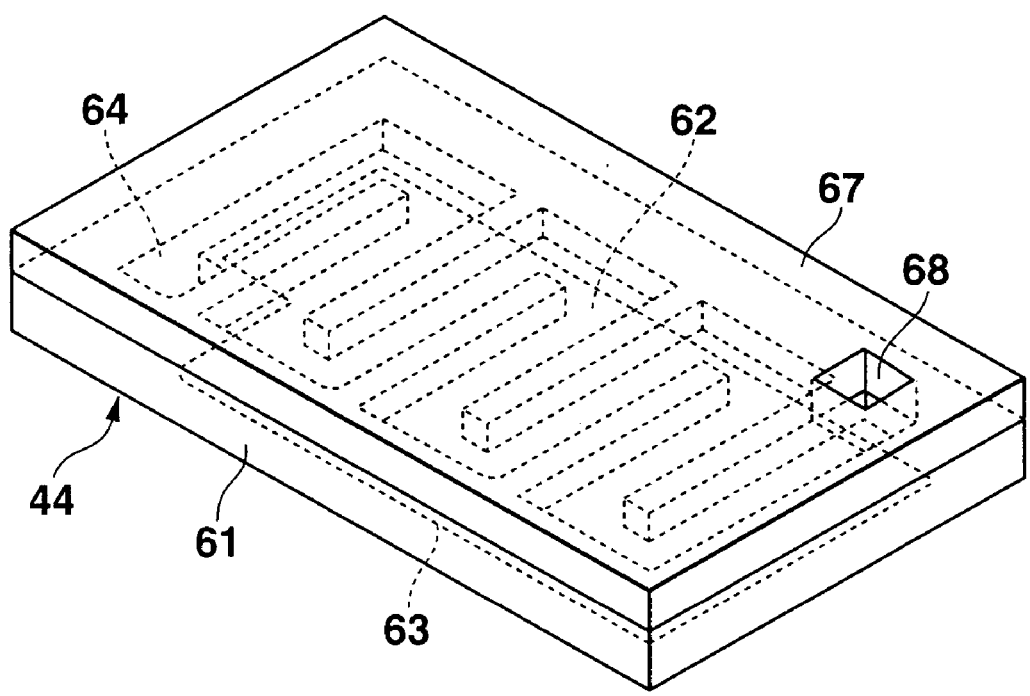
FIG. 10 is a perspective view of a portion of a fuel evaporator.

Consequently, the micropump 42 which communicates with the fuel package 21 having the smaller amount of the fuel 111 is driven to supply, to the fuel evaporator 44, the aqueous methanol solution contained in the fuel sealed portion 27 of the fuel package 21 having the smaller amount of the fuel 111. A practical structure of the fuel evaporator 44 will be explained below with reference to FIG. 10. The fuel evaporator 44 has a substrate 61 made of, e.g., silicon, glass, or an aluminum alloy and having a surface in which a zig-zag trench is formed, a thin film heater 63 and heater wiring (not shown) formed on the other surface of the substrate 61 to generate heat when a voltage is applied, and a substrate 67 made of a glass plate or the like and forming a flow path 62 by covering the trench in one surface of the substrate 61. An inlet 64 is formed in that portion of the substrate 61, which corresponds to one end portion of the flow path 62. An outlet 68 is formed in that portion of the substrate 67, which corresponds to the other end portion of the flow path 62.

Figure 11:
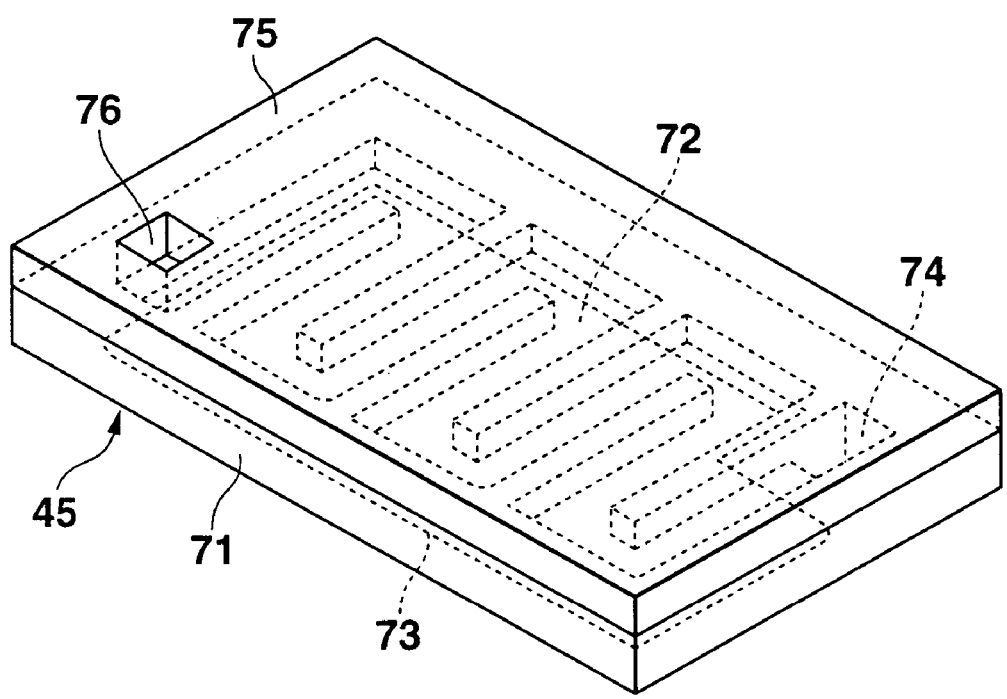
FIG. 11 is a perspective view of a portion of a fuel reformer.

A practical structure of the fuel reformer 45 will be described below with reference to FIG. 11. The fuel reformer 45 has a substrate 71 made of, e.g., silicon, glass, or an aluminum alloy and having a surface in which a zig-zag trench is formed, a thin film heater 73 and heater wiring (not shown) formed on the other surface of the substrate 71 to generate heat when a voltage is applied, and a substrate 75 made of a glass plate or the like and forming a flow path 72 by covering the trench in one surface of the substrate 71. An inlet 74 is formed in that portion of the substrate 71, which corresponds to one end portion of the flow path 72. An outlet 76 is formed in that portion of the substrate 75, which corresponds to the other end portion of the flow path 72. In addition, a catalyst (not shown) such as $Cu/ZnO/Al_2O_3$ is adhered to the inner wall surfaces of the flow path 72.

Figure 12:
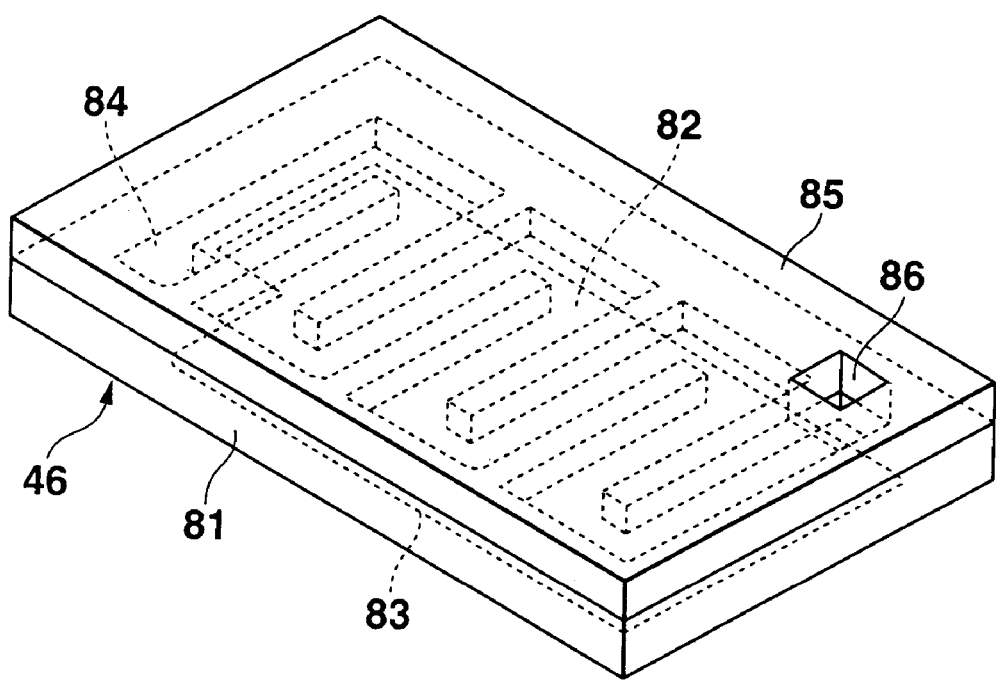
FIG. 12 is a perspective view of a portion of a CO eliminator.

A practical structure of the CO eliminator 46 will be described below with reference to FIG. 12. The CO eliminator 46 has a substrate 81 made of, e.g., silicon, glass, or an aluminum alloy and having a surface in which a zig-zag trench is formed, a thin film heater 83 and heater wiring (not shown) formed on the other surface of the substrate 81 to generate heat when a voltage is applied, and a substrate 85 made of a glass plate or the like and forming a flow path 82 by covering the trench in one surface of the substrate 81. An inlet 84 is formed in that portion of the substrate 81, which corresponds to one end portion of the flow path 82. An outlet 86 is formed in that portion of the substrate 85, which corresponds to the other end portion of the flow path 82. In addition, a catalyst (not shown) such as $Pt/Al_2O_3$ is adhered to the inner wall surfaces of the flow path 82.

The length of each of the flow paths 62, 72, and 82 of the fuel evaporator 44, fuel reformer 45, and CO eliminator 46, respectively, is preferably 3 cm (inclusive) to 20 cm (inclusive). Both the width and depth of each of the flow paths 62, 72, and 82 are about 100 to 1,000 μm.

In accordance with the command signal from the controller 55, the temperature controller 56 supplies predetermined electric power to the thin film heater 63 of the fuel evaporator 44, thereby heating the thin film heater 63. A predetermined amount of the fuel 111 (an aqueous methanol solution) in a liquid state is supplied from the fuel sealed portion 27 to the inlet 64 of the fuel evaporator 44 in accordance with the command signal from the controller 55. The thin film heater 63 generates heat (about 120° C.) and evaporates the aqueous methanol solution supplied into the flow path 62. The vaporized fluid moves from the inlet 64 to the outlet 68 by the internal pressure of the flow path 62, and reaches the inlet 74 of the fuel reformer 45.

In the fuel reformer 45, the thin film heater 73 is heated to an appropriate temperature (about 250 to 320° C.) in accordance with the command signal from the controller 55. In the flow path 72, the methanol and water reaching the inlet 76 of the fuel reformer 45 cause an endothermic reaction as indicated by

$$CH_3OH+H_2O \rightarrow 3H_2+CO_2 \tag{1}$$

as they are heated by the thin film heater 73, thereby producing hydrogen and carbon dioxide as a byproduct. This reaction also produces a slight amount of carbon monoxide.

In the initial stages of the reaction, water ($H_2O$) on the left side of formula (1) above can be water contained in the fuel 111 in the fuel sealed portion 27 of the fuel package 21. However, as power generation by the power generator 50 progresses, it becomes possible to collect and supply the produced water 112 to the fuel reformer 45. The reaction amount of formula (1) per unit volume in the fuel sealed portion 27 is increased by raising the sealing ratio of hydrogen-containing liquid fuel, liquefied fuel, or gaseous fuel, such as methanol, of the fuel 111 sealed in the fuel sealed portion 27. This allows the electric power to be supplied for longer time periods. The supply source of water on the left side of formula (1) during power generation by the power generator 50 can be the power generator 50 and fuel sealed portion 27, or the fuel sealed portion 27 alone. Alternatively, it is also possible to use water in the fuel sealed portion 27 in the initial stages of the reaction and, when the water 112 is produced in the power generator 50, switch to the water 112 in the power generator 50. Note that carbon monoxide is sometimes produced, albeit slightly, in the fuel reformer 45.

The produced hydrogen, carbon dioxide as a byproduct, and carbon monoxide move in a vaporized state from the outlet 74 to the inlet 84 of the CO eliminator 46. Since the temperature controller 56 supplies predetermined electric power to the thin film heater 83 in accordance with the command signal from the controller 55, the thin film heater 83 generates heat (about 120 to 220° C.). As a consequence, of the hydrogen, carbon monoxide, and water supplied into the flow path 82, the carbon monoxide and water react to cause an aqueous shift reaction which produces hydrogen and carbon dioxide as a byproduct, as indicated by $$CO + H_2O \rightarrow H_2 + CO_2 \qquad (2)$$

In the initial stages of the reaction, water ($H_2O$) on the left side of formula (2) above can be water contained in the fuel 111 in the fuel sealed portion 27 of the fuel package 21. However, as power generation by the power generator 50 progresses, it becomes possible to collect and supply the produced water 112 to the fuel reformer 45. The supply source of water on the left side of formula (2) during power generation by the power generator 50 can be the power generator 50 and fuel sealed portion 27, or the fuel sealed portion 27 alone. Alternatively, it is also possible to use water in the fuel sealed portion 27 in the initial stages of the reaction and, when the water 112 is produced in the power generator 50, switch to the water 112 in the power generator 50.

The fluid finally reaching the outlet 84 of the CO eliminator 46 mostly contains hydrogen and carbon dioxide. If a very slight amount of carbon monoxide is contained in the fluid reaching the outlet 84, this residual carbon monoxide can be brought into contact with oxygen taken in through the slits 11 from outside the power generation module 1 via the micropump 60, and can be reliably eliminated by causing a selective oxidation reaction which produces carbon dioxide as indicated by $$CO + (1/2)O_2 \rightarrow CO_2 \qquad (3)$$

The product after the series of reactions described above is made up of hydrogen and carbon dioxide (containing a slight amount of water in some cases). This fluid mixture is supplied to the power generator 50 by driving the micropump 48 which operates by receiving the supply of electric power from the sub-charger 54, in accordance with the command signal from the controller 55.

Figure 13:
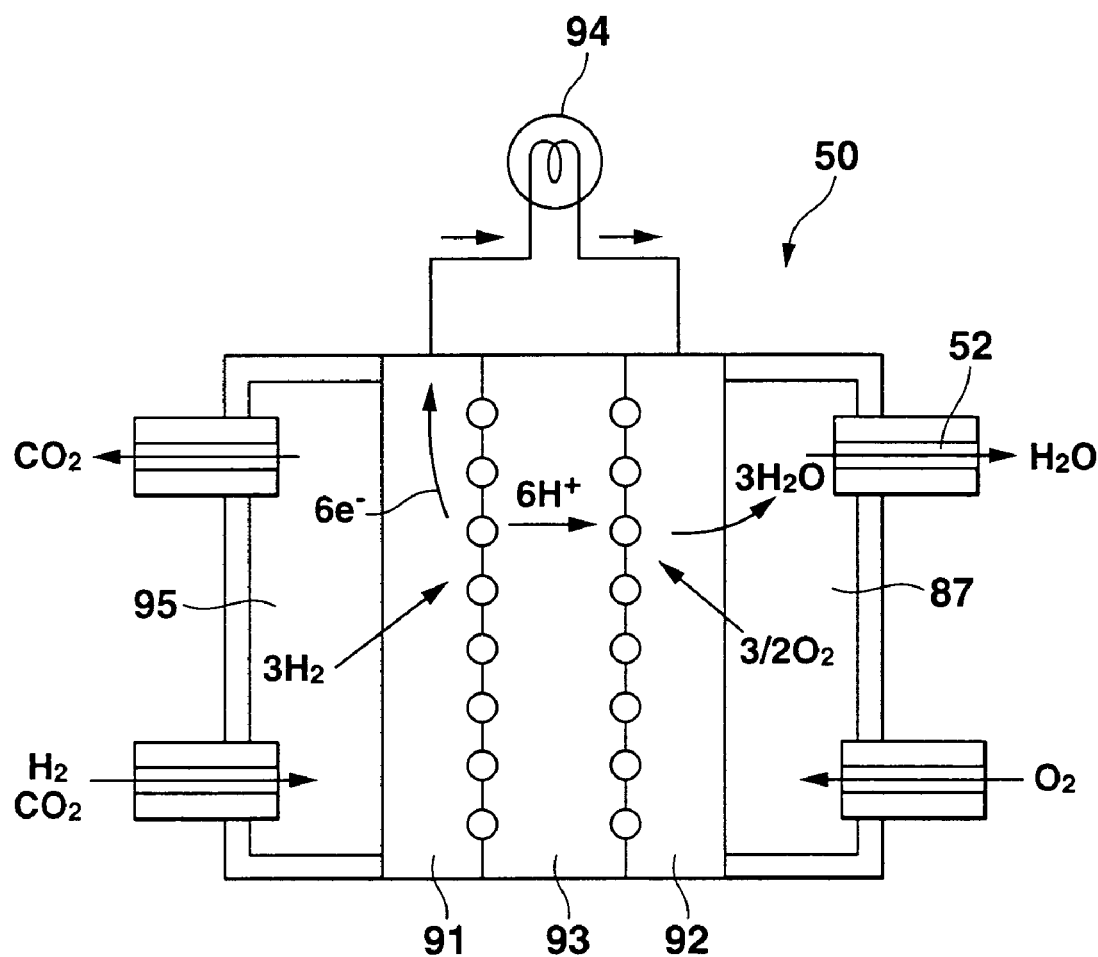
FIG. 13 is a view showing an outline of the arrangement of a power generator.

A practical structure of the power generator 50 will be described below with reference to FIG. 13. The power generator 50 is a well-known polymer electrolyte fuel cell. That is, the power generator 50 includes a fuel electrode 91 made of a carbon electrode to which a catalyst such as Pt/C is adhered, an oxygen electrode 92 made of a carbon electrode to which a catalyst such as Pt/Ru/C is adhered, and an ion conductive film 93 interposed between the fuel electrode 91 and oxygen electrode 92. The power generator 50 supplies electric power to a load 94 formed between the fuel electrode 91 and oxygen electrode 92. The load 94 may also be the charger 51 or the load 103 of the device 101 shown in FIG. 8.

In this structure, a space 95 is formed outside the fuel electrode 91. Into the space 95, hydrogen and carbon dioxide from the CO eliminator 46 are supplied. Also, the space or flow path 52 is formed outside the oxygen electrode 92. Into the flow path 52, oxygen taken in from the slits 12 is supplied.

On the side of the fuel electrode 91, electrons ($e^-$) are separated from hydrogen to generate hydrogen ions (protons; $H^+$) which move to the oxygen electrode 92 through the ion conductive film 93, and the fuel electrode 91 extracts and supplies the electrons ($e^-$) to the load 94, as indicated by $$3H_2 \rightarrow 6H^+ + 6e \qquad (4)$$

On the side of the oxygen electrode 92, the electrons ($e^-$) supplied via the load 94, the hydrogen ions ($H^+$) passing through the ion conductive film 63, and oxygen react with each other to produce the water 112 as a byproduct, as indicated by $$6H^+ + (3/2)O_2 + 6e^- \rightarrow 3H_2O \qquad (5)$$

The series of electrochemical reactions (formulas (4) and (5)) as described above progress in an environment at a relatively low temperature of about room temperature to about 80° C. A byproduct other than electric power is basically the water 112 alone. As indicated by formulas (4) and (5) above, the electric power (voltage-electric current) directly or indirectly supplied to the load 94 by the electrochemical reactions as described above depends upon the amount of hydrogen supplied to the fuel electrode 91 of the power generator 50.

The controller 55, therefore, controls driving of the micropump 42 so as to supply, to the power generator 50, the fuel 111 which can produce hydrogen in an amount necessary to generate and output predetermined electric power, and also controls driving of the micropump 42 so as to supply the generated hydrogen to the power generator 50. Note that the temperature controller 56 may also set the power generator 50 at a predetermined temperature in order to promote the reactions of formulas (4) and (5). In the space 95, the internal carbon dioxide concentration rises as power generation progresses and hydrogen passes through the ion conductive film 93. When this hydrogen concentration reaches a concentration at which no explosion occurs even if hydrogen in the space 95 is exhausted, the atmosphere in the space 95 is exhausted outside from the slits by the micropump 70.

The electric power generated by the power generator 50 is supplied to the charger 51 in the power generation module 1 and charges the charger 51. The charged power is supplied, as needed, from the charger 51 to the load 103 and controller 102 of the device 101. The electric power generated by the power generator 50 may also be directly supplied to the load 103 and controller 102 of the device 101.

In accordance with the command signal from the controller 55, the water 112 as a byproduct produced in the space 87 by the power generator 50 is collected in the byproduct collecting bag 28 of the fuel package 21 by the micropump 53 which operates by receiving the supply of electric power from the sub-charger 54. When at least a portion of the water 112 produced by the power generator 50 is supplied to the fuel reformer 45 as described above, the amount of water initially sealed in the fuel sealed portion 27 of the fuel package 21 can be reduced. Also, the amount of the water 112 collected in the byproduct collecting bag 28 can be reduced.

Figure 14:
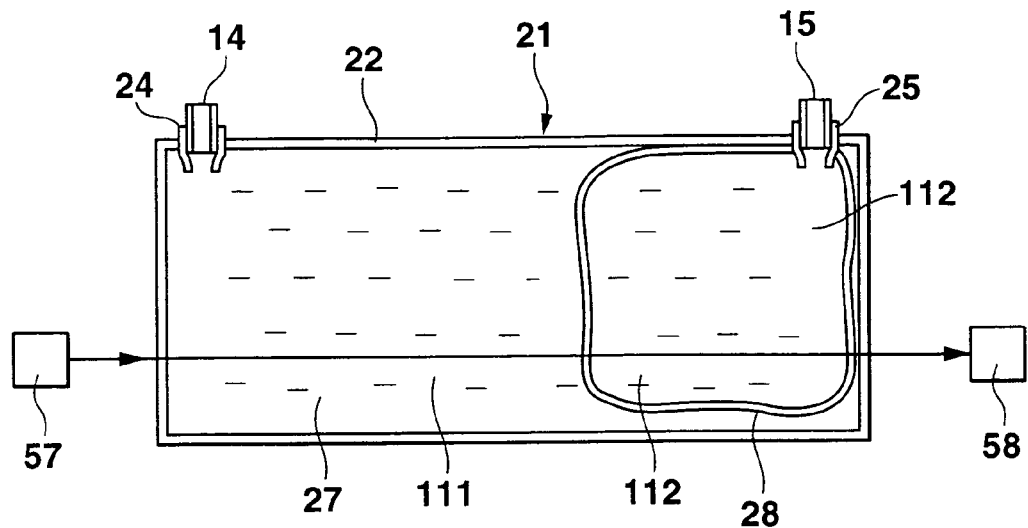
FIG. 14 is a cross-sectional view for explaining an example of detection of the remaining fuel amount in the fuel package.

When the power generating operation described above is performed to a certain degree, as shown in FIG. 14, the volume of the fuel sealed portion 27 decreases in accordance with the amount of the fuel 111 consumed in the power generating operation. Accordingly, the amount of the water 112 collected in the byproduct collecting bag 28 of the fuel package 21 increases. This increases the volume of the byproduct collecting bag 28.

During the power generating operation, the controller 55 constantly monitors the remaining amount of the fuel 111 in the fuel sealed portion 27. This remaining fuel amount monitoring will be explained below. As indicated by the arrows in FIG. 14, light emitted from the light-emitting portion 57 enters the photosensor 58 through the transparent case 22 and the byproduct collecting bag 28.

In the byproduct collecting bag 28, a certain amount of, e.g., red dye is sealed beforehand. Therefore, as the amount of the water 112 collected in the byproduct collecting bag 28 increases, the dye concentration decreases, and this raises the light transmittance of the dye-containing water in the byproduct collecting bag 28.

During the power generating operation, therefore, the controller 55 constantly receives a sense signal corresponding to the amount of light received by the photosensor 58, and checks whether remaining fuel amount data corresponding to the sense signal is less than preset remaining fuel amount data. Referring to FIG. 14, the volume of the fuel sealed portion 27 is larger than the half volume of the case 22, so sufficient fuel 111 for power generation remains in the fuel sealed portion 27.

In this case, therefore, on the basis of the sense signal from the photosensor 58, the controller 55 determines that sufficient fuel 111 for power generation remains in the fuel sealed portion 27 of the fuel package 21 on the right side of FIG. 1. Accordingly, the controller 55 allows the right indicator lamp 10 to keep emitting green light, allows the electromagnetic solenoid 38 to keep locking the fuel package locking slider 9, and keeps monitoring the remaining fuel amount. Note that the two indicator lamps 10 emit green light from the beginning as a result of initial remaining fuel amount monitoring by the controller 55.

Figure 15:
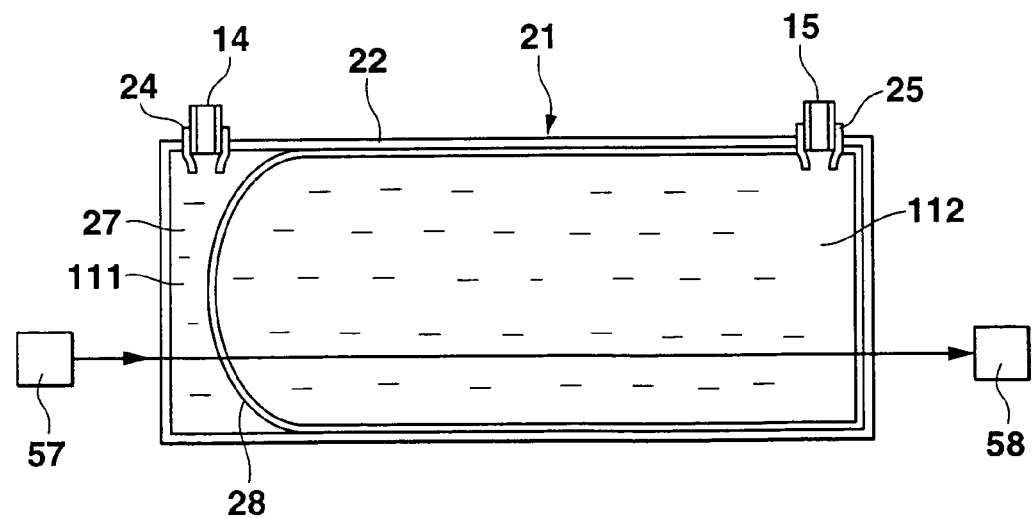
FIG. 15 is a cross-sectional view for explaining another example of the detection of the remaining fuel amount in the fuel package.

As shown in FIG. 15, if the power generating operation described above continues to considerably decrease the volume of the fuel sealed portion 27 and so sufficient fuel 111 for power generation does not remain in the fuel sealed portion 27 any longer, the amount of the water 112 collected in the byproduct collecting bag 28 considerably increases, and the dye concentration fairly decreases. This considerably raises the light transmittance of the dye-containing water in the byproduct collecting bag 28.

Accordingly, on the basis of the sense signal from the photosensor 58, the controller 55 determines that the sufficient fuel 111 for power generation does not remain in the fuel sealed portion 27 of the fuel package 21 on the right side of FIG. 1, and performs fuel supply switching (to be described later). In addition, the controller 55 switches light indication by the right indicator lamp 10 to red light to prompt the user to replace the right fuel package 21, and stops power supply to the right electromagnetic solenoid 38.

When power supply to the right electromagnetic solenoid 38 is stopped, the distal end portion of the rod 39 disengages from the engaging hole 34 of the right fuel package locking slider 9, thereby unlocking the right fuel package locking slider 9. Therefore, the user, prompted to replace the right fuel package 21 by red light indicated by the right indicator lamp 10, can replace the right fuel package 21 with a new fuel package by, e.g., operating the right fuel package locking slider 9.

When the right fuel package 21 is thus replaced with a new fuel package or a fuel package in which the remaining amount of the fuel 111 is equal to or larger than the set remaining fuel amount data, this fuel package is locked by the right fuel package locking slider 9 in the same manner as described above. After confirming that the remaining fuel amount is equal to or larger than the set remaining fuel amount, the controller 55 locks the right fuel package locking slider 9 by the electromagnetic solenoid 38, and causes the right indicator lamp 10 to emit green light.

Even if the user tries to replace the left fuel package locking slider 9 by mistake when the right fuel package 21 is to be replaced as described above, the left fuel package locking slider 9 is locked by the dedicated electromagnetic solenoid 38 and hence is not removed by mistake.

Fuel supply switching will be described below. If, on the basis of the sense signal from the photosensor 58, the controller 55 determines that sufficient fuel 111 for power generation does not remain in the fuel sealed portion 27 of one fuel package 21 shown in FIG. 1, the controller 55 outputs a command signal to the sub-charger 54 to supply electric power only to the micropump 42 of the other fuel package 21, before the power generator 50 starts generating power. Also, the controller 55 outputs a driving control signal to the micropump 42 of the other fuel package 21.

Consequently, the micropump 42 of the other fuel package 21 starts operating to supply, to the fuel evaporator 44, the fuel 111 made of an aqueous methanol solution in the fuel sealed portion 27 of the other fuel package 21. In this manner, when insufficient fuel 111 remains in one fuel package 21 any longer, the fuel 111 is automatically supplied from the other fuel package 21. This allows the device 101 to be continuously used without replacing the former fuel package 21 with a new one.

When at least the charger 51 is well charged by the power generating operation described above, the controller 55 receives from the charger 51 a signal indicating that the charger 51 is well charged, regardless of whether the electric power is supplied to the load 103 of the device 101. On the basis of this signal, the controller 55 stops the above power generating operation. On the other hand, if, while the power generating operation is stopped, the charged electric power is supplied from the charger 51 to the load 103 and controller 102 of the device 101 and the charge amount of the charger 51 becomes smaller than a certain value, the controller 55 receives from the charger 51 a signal indicating that the charge amount is smaller than the certain value, regardless of whether the electric power is supplied to the load 103 of the device 101. On the basis of this signal, the controller 55 restarts the power generating operation.

When stopping the power generating operation, the controller 55 stops power supply to both the electromagnetic solenoids 38 and makes both the fuel package locking sliders 9 operable. Therefore, both the fuel packages 21 can be removed while the power generating operation is stopped. Since the case 22 of the fuel package 21 is transparent, the remaining amount of the fuel 111 in the fuel sealed portion 27 of the removed fuel package 21 can be visually checked.

If both the fuel packages 21 are removed and the removed fuel packages 21 are accommodated in the fuel package accommodating portions 5 different from the original ones by mistake, one fuel package 21 is in use and not full of the fuel 111, and the other fuel package 21 is unused and full of the fuel 111. In a case like this, the remaining amounts of the fuel 111 in the two fuel packages 21 are detected, and the controller 55 selects a fuel package 21 having a smaller remaining amount, and generates electric power by using the fuel 111 supplied from the fuel package 21 having the smaller remaining amount. If the controller 55 determines that both the two fuel packages 21 are brand-new and they contain equal amounts of fuel, the controller 55 selects a predetermined one, e.g., the right fuel package 21, and generates electric power by using the fuel 111 supplied from the right fuel package 21.

The fuel applied to a fuel reforming type fuel cell currently being researched and developed is fuel with which the power generator 50 can generate electrical energy at a relatively high energy conversion efficiency. Examples are alcohol-based liquid fuel such as methanol, ethanol, and butanol, hydrogen-containing liquid fuel which is vaporized at room temperature and atmospheric pressure, e.g., liquefied gases such as dimethyl ether, isobutane, and natural gas (CNG), and gaseous fuel such as hydrogen gas. These fluid materials can be preferably used.

The present invention is not limited to the aforementioned evaporation and reforming reactions of an aqueous methanol solution. That is, any chemical reaction which occurs at least under predetermined heating conditions can be preferably applied. In addition, an application is not limited to the fuel cell described above, provided that electric power can be generated by using a predetermined fluid material produced by a chemical reaction as the power generation fuel 111.

Accordingly, power generators having various forms can be used. Examples are power generation (thermal energy conversion) using thermal energy generated by combustion of a fluid material produced by a chemical reaction, power generation (by internal and external combustion engines such as a gas combustion turbine, rotary engine, and Stirling engine) which uses, e.g., dynamic energy conversion by which electric power is generated by rotating a generator by using pressure energy generated by combustion, and power generation (e.g., magneto-hydro-dynamics and thermoacoustic effect power generation) by which the fluid energy or thermal energy of power generation fuel is converted into electric power by using, e.g., the principle of electromagnetic induction.

When liquefied hydrogen or hydrogen gas is directly used as the fuel 111, the fuel 111 can be directly supplied to the power generator 50 by omitting the fuel evaporator 44, fuel reformer 45, and CO eliminator 46.

The power generation module 1 can be incorporated into the notebook personal computer 101. FIG. 16A is a side view of the notebook personal computer 101 into which the power generation type portable power supply is inserted, when they are viewed from the side of the power generation type portable power supply. FIG. 16B is a front view showing, from above, the notebook personal computer 101 into which the power generation type power supply is inserted. FIG. 16C is a side view showing, from the side, the notebook personal computer 101 into which the power generation type power supply is inserted.

The notebook personal computer 101 has a keyboard on its upper surface, a main body 97 containing a motherboard and the like, battery support portions 98 positioned at the back of the main body 97, a display panel 99 such as a liquid crystal display, and panel support portions 100 which allow the display panel 99 to freely pivot with respect to the main body 97. The power generation module 1 has grooves 96 in its two end portions, so that the grooves 96 are fitted on guide projections 104 formed on the battery support portions 98 of the notebook personal computer 101.

As shown in FIG. 17, the power generation module 1 functions as a power generation type portable power supply when slid until the positive electrode terminal 6 and negative electrode terminal 7 of the power generation module 1 are inserted into the connector 107 of the notebook personal computer 101, while the grooves 96 (only one is shown in FIG. 17) at the two ends of the power generation module 1 are fitted on the guide projections 104 formed inside the two battery support portions 98 of the notebook personal computer 101.

This power generation type portable power supply may also be automatically locked so as not to be removed from the notebook personal computer 101 if electrical driving other than that by the internal battery is required except when the notebook personal computer 101 is driven by the internal battery in a standby state.

Another power generation type portable power supply can be incorporated into the notebook personal computer 101. FIG. 18A is a side view of the notebook personal computer 101 into which this power generation type portable power supply is inserted, when they are viewed from the side of the power generation type portable power supply. FIG. 18B is a front view showing, from above, the notebook personal computer 101 into which the power generation type power supply is inserted. FIG. 18C is a side view showing, from the side, the notebook personal computer 101 into which the power generation type power supply is inserted.

A case 106 of the fuel package 21 of the power generation type portable power supply of this embodiment is the same as the case 22 of the above embodiment, except that the case 106 is made of a biodegradable polymer which naturally decomposes by decomposing factors such as bacteria, and that the case 106 is a size smaller than the fuel package accommodating portion 5.

A protection case 105 made of a material other than a biodegradable polymer and fitted on the power generation module 1 so as to cover the case 106 tightly is formed to prevent a leak of the fuel 111 by preventing decomposition of the case 106 by some external cause while the case 106 is in use after being accommodated in the fuel package accommodating portion 5. When the protection case 105 is transparent, whether the fuel package 21 (case 106) is set can be easily checked with the protection case attached to the power generation module 1.

Since the case 106 is made of a biodegradable polymer as described above, the effect on the environment can be reduced even if the used case 106 is thrown away into the soil. This solves the environmental problems caused by throwing away or burying existing chemical batteries.

The case 106 of the fuel package 21 is made of a polymer resin. Therefore, to protect the circumferential surface of an unused case 106 from decomposing factors such as bacteria, the case 106 is desirably covered with a package made of a material other than a biodegradable polymer, and put on the market in this state. When the fuel package 21 is to be attached, the package need only be peeled from the fuel package 21.

In the power generation module 1 of each embodiment described above, a plurality of fuel packages accommodated in the two fuel package accommodating portions 5 can be independently removed while the power generator 50 is not generating electric power, and a fuel package 21 to which the fuel 111 is not supplied can be removed while the power generator 50 is generating electric power. Even when the power generation fuel 111 is sealed in an amount necessary for power generation in only one of the accommodated fuel packages, the micropump 42 so operates that the power generation module 1 selectively receives the power generation fuel 111 from this fuel package. The micropump 42 corresponding to a fuel package not containing the power generation fuel 111 in an amount necessary for power generation does not operate to supply the power generation fuel 111. Therefore, this fuel package can be readily removed and replaced with a fuel package in which the power generation fuel is sealed in an amount necessary for power generation.

Even when one fuel package is accommodated in a plurality of fuel package accommodating portions 5, if the accommodated fuel package has a fuel amount necessary for power generation, the power generation module 1 of each embodiment can generate electric power by selectively receiving the power generation fuel 111 from this fuel package.

If two fuel packages are accommodated in the fuel package accommodating portions 5 and the power generation fuel 111 in an amount necessary for power generation is sealed in each of these accommodated fuel packages, the power generation module 1 of each embodiment compares the amounts of the power generation fuel 111 in the two accommodated fuel packages, and selectively operates the micropump 42 such that the power generation fuel 111 is supplied to the power generation module 1 only from a fuel package having a smaller but sufficient amount necessary for power generation.

Also, the fuel package accommodating portions of the power generation module 1 of each embodiment can accommodate fuel packages having the same structure. Since only one type of fuel package needs to be used, the user need only remember the same way of mounting whenever he or she mounts a fuel package in the fuel package accommodating portion 5. This makes the operation simple.

Furthermore, while at least one of the fuel packages accommodated in a plurality of fuel package accommodating portions 5 is supplying the power generation fuel 111 to the power generation module, the controller locks this fuel package so as not to be removed from the power generation module, and keeps a fuel package unlocked from which the power generation fuel 111 is not supplied, thereby realizing a safe structure in which a normal power generating operation takes place. If none of a plurality of fuel packages is supplying the power generation fuel 111 to the power generation module 1, all these fuel packages are unlocked and hence can be easily removed.

With this arrangement, while a first fuel package is supplying the power generation fuel 111 to the power generation module 1 with this first fuel package, a second fuel package being accommodated in the fuel package accommodating portions 5, the amount of the power generation fuel 111 remaining in the first fuel package is detected. If, on the basis of this remaining fuel amount detection signal, the controller determines that sufficient power generation fuel 111 for power generation does not remain in the first fuel package, the controller switches the supply of the power generation fuel 111 to the power generator from the first fuel package to the second fuel package. During this fuel package supply switching, the controller unlocks the locked first fuel package and locks the unlocked second fuel package.

In each embodiment, the number of fuel packages which can be accommodated in the fuel package accommodating portions 5 can be set to K (K is an integer of 2 or more), and one to K fuel packages can be simultaneously inserted and operated. Even when the number of fuel packages accommodated in the fuel package accommodating portions is 1 to (K−1), if the accommodated fuel package has an amount necessary for power generation, the power generation module can selectively receive the power generation fuel 111 from this fuel package. Also, this power generation module can be so set as to be able to receive the power generation fuel 111 from two or more fuel packages at the same time. In each embodiment, two fuel cells as the power generators 50 of the power generation type portable power supply are used in accordance with the number of fuel packages. However, only one fuel cell can also be used. If three or more fuel package accommodating portions 5 are formed, the number of fuel cells can be either the same as or different from the number of the fuel package accommodating portions 5. When the fuel packages 21 are accommodated in three or more fuel package accommodating portions 5 of the power generation module 1, the fuel 111 can be supplied from a plurality of fuel packages 21 at the same time, provided that the fuel 111 is not supplied from all the fuel packages 21 at the same time.

In each embodiment, the power generation module 1 has two output terminals, i.e., the positive electrode terminal 6 and negative electrode terminal 7. In addition to the positive electrode terminal 6 and negative electrode terminal 7, however, it is also possible to form input/output terminals such as a temperature sensor signal input/output terminal for sensing the temperature of at least one of the fuel evaporator, the fuel reformer, the CO eliminator, and the power generator in the power generation module, each of which uses a thin film heater, and for transmitting the temperature data to the device 101, a control circuit clock line terminal for outputting a clock signal to the controller 55, a control circuit data line terminal for exchanging necessary data between the controller 55 and device 101, and a remaining amount data output terminal for outputting data indicating, e.g., the remaining amount of the fuel 111, from the controller 55 to the device 101.

Referring to FIGS. 7A and 7B, both the outer diameter of the cylindrical fuel supply port 14 and the inner diameter of the cylindrical member 24a of the fuel supply hole 24 are D, both the height of the outer shape of the byproduct collection port 15 and the height of the inner shape of the pipe-like member 25a are H, and both the width of the outer shape of the byproduct collection port 15 and the width of the inner shape of the pipe-like member 25a are W. Strictly speaking, however, as shown in FIGS. 19A and 19B, the outer diameter of the fuel supply port 14 is D, the height of the outer shape of the byproduct collection port 15 is H, the width of the outer shape of the byproduct collection port 15 is W, the inner diameter of the cylindrical member 24a of the fuel supply hole 24 is D' (D' is slightly larger than the outer diameter D), the height of the inner shape of the pipe-like member 25a is H' (H' is slightly larger than the height H of the outer diameter), and the width of the inner shape of the pipe-like member 25a is W' (W' is slightly larger than the width W). With this arrangement, the fuel supply port 14 can be readily fitted in the cylindrical member 24a, and the byproduct collection port 15 can be fitted in the pipe-like member 25a. Since the outer diameter D of the fuel supply port 14 is larger than the height H' of the byproduct collection hole 25, the byproduct collection hole 25 cannot be fitted on the fuel supply port 14. Likewise, the width W of the byproduct collection port 15 is larger than the inner diameter D' of the fuel supply hole 24, so the fuel supply hole 24 cannot be fitted on the byproduct collection port 15.

In FIGS. 7A and 7B as described above, the fuel package 21 having a fuel supply port 14 and byproduct collection port 15 different in shape is used. By making the shapes of the cylindrical member 24a of the fuel supply port 24 and the pipe-member 25a of the byproduct collection hole 25 different from each other in accordance with the fuel package 21, the fuel package 21 is prevented from being inserted upside down by mistake. However, the same effect can also be obtained only by making the dimensions of the fuel supply port 14 and byproduct collection port 15 different from each other, and making the dimensions of the pipe-like member 24a of the fuel supply hole 24 and the pipe-like member 25a of the byproduct collection hole 25 different from each other. That is, if the longitudinal sections of the fuel supply port 14, the byproduct collection port 15, the cylindrical member 24a of the fuel supply hole 24, and the byproduct collection hole 25 have the same shape but different dimensions, at least one of the pipe-like members 24a and 25a cannot be accommodated. Since the switch 16 cannot be completely pressed, no power generating operation can be started.

The fuel supply port 14 and fuel supply hole 24 are positioned in the lower portion of the fuel package 21 so that the heat generation fuel 111 in the fuel package 21 efficiently drops into the flow path 41, and preferably positioned in the lower portion to such an extent that the remaining amount in the fuel package 21 is 10% or less when the power generation fuel 111 in the fuel package 21 drops.

The byproduct collection port 15 and byproduct collection hole 25 are positioned in the upper portion of the fuel package 21 so that water as a byproduct efficiently drops into the byproduct collecting bag, and are preferably positioned in the upper portion to such an extent that 50% or more of an unnecessary amount to be collected of the produced water efficiently drop into the byproduct collecting bag 28.

In each embodiment, the longitudinal section outer shape of that portion of the fuel supply port 14, which is to be fitted in the fuel supply port 24 and the longitudinal section inner shape of that portion of the fuel supply hole 24, which is to be fitted on the fuel supply port 14 are circles. However, these outer and inner shapes are not limited to circles but can be, e.g., polygons such as rectangles, provided that the byproduct collection hole 25 is not fitted on the fuel supply port 14 and the fuel supply hole 24 is not fitted on the byproduct collection port 15. Similarly, in each embodiment, the longitudinal section outer shape of that portion of the byproduct collection port 15, which is to be fitted in the byproduct collection hole 25 and the longitudinal section inner shape of that portion of the byproduct collection hole 25, which is to be fitted on the byproduct collection port 15 are rectangles. However, these outer and inner shapes need not be rectangles but can be, e.g., other polygons, circles, or ellipses, provided that the fuel supply hole 24 is not fitted on the byproduct collection port 15 and the byproduct collection hole 25 is not fitted on the fuel supply port 14.

More specifically, the length of the opening in a predetermined direction x of the fuel supply port 14 is made smaller than the length of the opening in the predetermined direction x of the byproduct collection port 15 (e.g., the predetermined direction x is the lateral direction in FIGS. 7A and 7B), and the length of the opening in a predetermined direction y, which is different from the predetermined direction x, of the fuel supply port 14 is made larger than the length of the opening in the predetermined direction y of the byproduct collection port 15 (e.g., the predetermined direction y is the longitudinal direction in FIGS. 7A and 7B). In accordance with these dimensions, the length of the opening in the predetermined direction x of the pipe-like member 24a of the fuel supply port 24 of the fuel package 21 is made smaller than the length of the opening in the predetermined direction x of the pipe-like member 25a of the byproduct collection hole 25, and the length of the opening in the predetermined direction y of the pipe-like member 24a is made larger than the length of the opening of the pipe-like member 25a. In this manner, it is possible to prevent the fuel supply hole 24 of the fuel package 21 from being fitted in the byproduct collection port 15, and the byproduct collection hole 25 from being fitted on the fuel supply port 14.

In each embodiment, the shapes or dimensions of the fuel supply port 14 and byproduct collection port 15 are made different from each other, and the shapes or dimensions of the fuel supply hole 24 and byproduct collection hole 25 are made different from each other, thereby preventing the fuel supply hole 24 and byproduct collection hole 25 of the fuel package 21 from being connected to the byproduct collection port 15 and fuel supply port 14, respectively, of the fuel package accommodating portion 5 by mistake. However, these shapes or dimensions may also be the same as shown in FIGS. 20A and 20B. That is, a length L1 between the guide projection 13 and the outer shape of the fuel supply port 14 in the longitudinal direction of the power generation module 1 and a length L2 between the guide projection 13 and the outer shape of the byproduct collection port 15 in the longitudinal direction of the power generation module 1 are made different from each other, and a length L1' (L1' is slightly shorter than L1 to make fitting possible) between the guide groove 23 and the inner shape of the fuel supply hole 24 in the longitudinal direction of the fuel package 21 and a length L2' (L2' is slightly shorter than L2 to make fitting possible) between the guide groove 23 and the inner shape of the byproduct collection hole 25 in the longitudinal direction of the fuel package 21 are made different from each other. In this way, it is possible to prevent the fuel supply hole 24 and byproduct collection hole 25 of the fuel package 21 from being connected, respectively, to the byproduct collection port 15 and fuel supply port 14 of the fuel package accommodating portion 5 by mistake.

Also, as shown in FIGS. 21A and 21B, a length L3 between the guide projection 13 and the outer shape of the fuel supply port 14 in the lateral direction of the power generation module 1 and a length L4 between the guide projection 13 and the outer shape of the byproduct collection port 15 in the lateral direction of the power generation module 1 are made different from each other, and a length L3' (L3' is slightly shorter than L3 to make fitting possible) between the guide groove 23 and the inner shape of the fuel supply hole 24 in the lateral direction of the fuel package 21 and a length L4' (L4' is slightly shorter than L4 to make fitting possible) between the guide groove 23 and the inner shape of the byproduct collection hole 25 in the lateral direction of the fuel package 21 are made different from each other. The same effect can be obtained by this arrangement.

Alternatively, as shown in FIGS. 22A and 22B, a shortest distance L5 between the guide projection 13 and the outer shape of the fuel supply port 14 and a shortest distance L6 between the guide projection 13 and the outer shape of the byproduct collection port 15 are made different from each other, and a shortest distance L5' (L5' is slightly shorter than L5 to make fitting possible) between the guide groove 23 and the inner shape of the fuel supply hole 24 and a shortest distance L6' (L6' is slightly shorter than L6 to make fitting possible) between the guide groove 23 and the inner shape of the byproduct collection hole 25 are made different from each other. The same effect can be obtained by this arrangement.

In the embodiments shown in FIGS. 20A to 22B, the fuel supply port 14 and byproduct collection port 15 have the same shape and the same size. However, the fuel support port 14 and byproduct collection port 15 may also have different shapes or different sizes.

In each embodiment, the fuel supply port 14 is positioned above the guide projection 13, and the byproduct collection port 15 is positioned below the guide projection 13. However, the present invention is not limited to this positional relationship.

Also, in each embodiment, the fuel supply port 14 is positioned on the left side of the byproduct collection port 15 in the fuel package accommodating portion 5. However, the fuel supply port 14 may also be positioned on the right side. Likewise, although the fuel supply hole 24 is positioned on the left side of the byproduct collection hole 24 in the fuel package 21, the fuel supply hole 24 may also be positioned on the right side.

As shown in FIG. 23A, the fuel supply port 14 and byproduct collection port 15 may also be formed on the same side of the fuel package accommodating portion 25. Also, as shown in FIG. 23B, the fuel supply hole 24 and byproduct collection hole 25 may also be formed on the same side. In this case, the length L1 between the guide projection 13 and the outer shape of the fuel supply port 14 in the longitudinal direction of the power generation module 1 and the length L2 between the guide projection 13 and the outer shape of the byproduct collection port 15 in the longitudinal direction of the power generation module 1 can be either different or the same. In the same way, the length L1' between the guide groove 23 and the inner shape of the fuel supply hole 24 in the longitudinal direction of the fuel package 21 and the length L2' between the guide groove 23 and the inner shape of the byproduct collection hole 25 in the longitudinal direction of the fuel package 21 can be either different or the same. In addition, in the power generation module 1 and fuel package 21 shown in FIGS. 23A and 23B, the length L3 between the guide projection 13 and the outer shape of the fuel supply port 14 in the lateral direction of the power generation module 1 and the length L4 between the guide projection 13 and the outer shape of the byproduct collection port 15 in the lateral direction of the power generation module 1 can be either different or the same, and the length L3' between the guide groove 23 and the inner shape of the fuel supply hole 24 in the lateral direction of the fuel package 21 and the length L4' between the guide groove 23 and the inner shape of the byproduct collection hole 25 in the lateral direction of the fuel package 21 can be either different or the same. Furthermore, in the power generation module 1 and fuel package 21 shown in FIGS. 23A and 23B, the shortest distance L5 between the guide projection 13 and the outer shape of the fuel supply port 14 and the shortest distance L6 between the guide projection 13 and the outer shape of the byproduct collection port 15 can be either different or the same, and the shortest distance L5' between the guide groove 23 and the inner shape of the fuel supply hole 24 and the shortest distance L6' between the guide groove 23 and the inner shape of the byproduct collection hole 25 can be either different or the same.

In each embodiment, the guide projections 13 and guide grooves 23 are formed on the two sides of the fuel package accommodating portion 5 of the power generation module. However, the guide projection 13 and guide groove 23 may also be formed on one side only. As shown in FIGS. 24A and 24B, the guide projections 13 and guide grooves 23 may also be formed in the longitudinal direction of the fuel package accommodating portion 5 or on the upper or lower side only. If the fuel supply port 14 and byproduct collection port 15 shown in FIG. 24A have the same shape and size, the distance between the fuel supply port 14 and guide projection 13 and the distance between the byproduct collection port 15 and guide projection 13 desirably have one of the relationships as shown in FIGS. 20A to 22B. If the fuel supply hole 24 and byproduct collection hole 25 shown in FIG. 24B have the same shape and size, the distance between the fuel supply hole 24 and guide groove 23 and the distance between the byproduct collection hole 25 and guide groove 23 desirably have one of the relationships as shown in FIGS. 20A to 22B. Wrong fitting by mistake may also be prevented by giving different shapes or sizes to the fuel supply port 14 and byproduct collection port 15, and giving different shapes or sizes to the fuel supply hole 24 and byproduct collection hole 25 shown in FIGS. 24A and 24B.

In each embodiment, the guide projections 13 are formed on the power generation module 1, and the guide grooves 23 are formed on the fuel package 21. It is also possible to form guide grooves on the power generation module 1 and guide projections matching the guide grooves on the fuel package 21. Alternatively, it is possible to form a guide projection and guide groove on the power generation module 1, and form a corresponding guide groove and guide projection, respectively, on the fuel package 21.

In each embodiment, the relative positions in the longitudinal and lateral directions of the power generation module and fuel package are set by using the guide projections 13 and guide grooves 23 as reference points. However, when a power generation module and fuel package having no guide portions are to be connected, wrong connection can be prevented by setting the relative positions between relative position setting members other than guides and the fuel supply port 14, byproduct collection port 15, fuel supply hole 24, and byproduct collection hole 25 as in each embodiment described above.

Figure 25A:
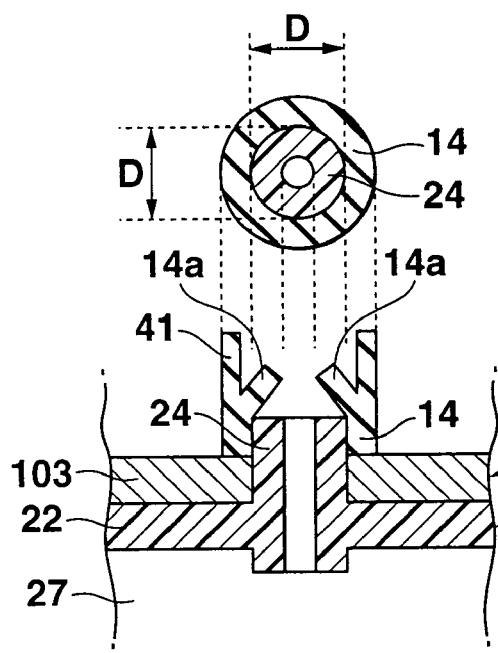
FIGS. 25A and 25B are cross-sectional views each showing a portion of the state in which a fuel package is accommodated in a fuel package accommodating portion according to still another embodiment.
Figure 25B:
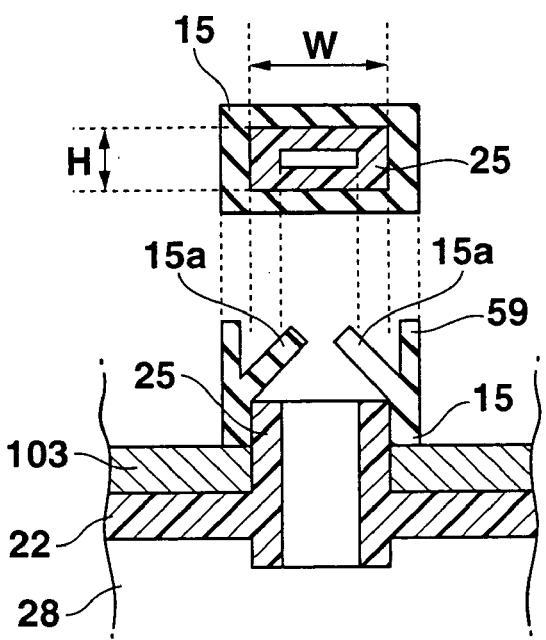

In each embodiment, the pipe-like member 24a of the fuel supply hole 24 and the pipe-like member 25a of the byproduct collection hole 25 of the fuel package 21 are connected to the fuel supply port 14 and byproduct collection port 15, respectively, of the power generation module 1 so as to cover the fuel supply port 14 and byproduct collection port 15, respectively. However, as shown FIGS. 25A and 25B, a fuel supply port 14 and byproduct collection port 15 formed on a wall 103 of the fuel package accommodating portion 5 may also be connected to a fuel supply hole 24 and byproduct collection hole 25, respectively, of the fuel package 21 so as to cover the fuel supply hole 24 and byproduct collection hole 25, respectively, thereby opening a valve 14a of the fuel supply port 14 and a valve 15a of the byproduct collection port 15 to allow the power generation fuel and water to move.

In each embodiment, whether the fuel package 21 is normally accommodated in the fuel package accommodating portion 5 is checked by using one switch 16. However, this check may also be performed by using a plurality of switches.

Although each embodiment relates to a reforming type fuel cell, the present invention is also applicable to a direct fuel type fuel cell by which fuel is directly supplied to a fuel cell. In this fuel cell, the fuel reformer 45 and CO eliminator 46 are unnecessary, and an unreacted fuel collection port for discharging unreacted fuel of fuel supplied to the space 95 is formed instead of the byproduct collection port 15 for discharging water as a byproduct. In addition, it is possible to form a circulating structure in which unreacted fuel collected by the fuel package 21 can be supplied from the fuel supply hole 24 to the fuel supply port 14, without forming the byproduct collecting portion 28 made of a polymer resin in the fuel package 21. In this structure, if a compound containing, in its composition, hydrogen extracted as hydrogen ions by the fuel cell is held in the form of an aqueous solution in the fuel package 21 and if the specific gravity of this compound is lower than that of water, the fuel supply port 14 is positioned above the byproduct collection port 15, and the fuel supply hole 24 is positioned above the unreacted fuel collection port. In this way, the high-concentration compound is supplied to the fuel support port 14 as much as possible.

The power generation type portable power supply of this embodiment can be used as a power supply of a highly portable electronic apparatus, such as a cell phone, PDA, digital still camera, and digital video camera, as well as a notebook personal computer.

In particular, even when one fuel package is consumed and has an insufficient amount for power generation while a user is talking on a cellphone or shooting a movie with a digital video camera, this fuel package is switched to the other fuel package to supply the power generation fuel 111 from it.

Therefore, the user can keep using the electronic apparatus without turning it off, i.e., without once terminating the conversation or shooting.

The present invention has a structure by which openings for moving the power generation fuel 111 from a fuel package to a power generation module are normally fitted, openings for moving a byproduct produced by the power generation module from the power generation module to the fuel package are normally fitted, and the openings for moving the power generation fuel 111 from the fuel package to the power generation module and the openings for moving the byproduct produced by the power generation module from the power generation module to the fuel package are not fitted by mistake. Consequently, damage to the power generation module can be prevented, and the fuel package can be safely replaced.

What is claimed is:

1. A power generation module for generating electric power by using fuel, comprising:

a module including at least one fuel package accommodating portion capable of accommodating a fuel package which has a fuel supply hole and a collection hole having a shape and/or size different from that of the fuel supply hole, and in which the fuel is sealed, the fuel package accommodating portion having a height and a length;

first and second guide portions which guide the fuel package to be accommodated in a predetermined position of the fuel package accommodating portion, each of the first and second guide portions comprising one of a guide projection and a guide groove, and the fuel package accommodating portion including a fuel supply port capable of connecting to the fuel supply hole of the fuel package, and a collection port capable of connecting to the collection hole of the fuel package, and having a shape and/or size different from that of the fuel supply port; and a power generator which generates electric power by using the fuel supplied from a given fuel supply port, wherein:

(i) a distance in a direction of the height of the fuel package accommodating portion between the collection port, and the one of the guide projection and the guide groove of the first guide portion, which is provided on the fuel package accommodating portion, and a distance in the direction of the height of the fuel package accommodating portion between the fuel supply port, and the one of the guide projection and the guide groove of the second guide portion, which is provided on fuel package accommodating portion, are different from each other, (ii) a distance in a direction of the length of the fuel package accommodating portion between the collection port, and the one of the guide projection and guide groove of the first guide portion, which is provided on the fuel package accommodating portion, and a distance in the direction of the length of the fuel package accommodating portion between the fuel supply port, and the one of the guide projection and guide groove of the second guide portion, which is provided on the fuel package accommodating portion, are different from each other, or (iii) a shortest distance between the collection port, and the one of the guide projection and the guide groove of the first guide portion, which is provided on the fuel package accommodating portion, and a shortest distance between the fuel supply port, and the one of the guide projection and the guide groove of the second guide portion, which is provided on the fuel package accommodating portion, are different from each other.

2. The power generation module according to claim 1, wherein a length of an opening in a predetermined direction x of the fuel supply port, which is the direction of the length of the fuel package accommodating portion, is made smaller than a length of an opening in the predetermined direction x of the collection port, and wherein a length of the opening in a predetermined direction y of the fuel supply port, which is the direction of the height of the fuel package accommodating portion, is made larger than a length of the opening in the predetermined direction y of the collection port.

3. The power generation module according to claim 1, wherein the fuel package accommodating portion further comprises a switch for checking whether the fuel package is normally accommodated in the fuel package accommodating portion.

4. The power generation module according to claim 1, further comprising a reformer which reforms the fuel.

5. The power generation module according to claim 1, wherein the collection port is a port which discharges a byproduct produced during power generation.

6. The power generation module according to claim 1, wherein the collection port is an unreacted fuel collection port for discharging to the fuel package unreacted fuel of the fuel supplied.

7. The power generation module according to claim 1, wherein the module includes an elongate member, and first and second projection portions which are spaced apart from each other in the direction of the length of the fuel package accommodating portion, wherein the first and second projection portions have opposite inner surfaces to define the fuel package accommodating portion therebetween, each of the inner surfaces having the one of the guide projection and the guide groove, and wherein said fuel package includes opposite outer surfaces each having the other of the guide projection and guide groove.

8. The power generation module according to claim 7, wherein said elongate member supports the fuel supply port and the collection port near the first and second projection portions.

* * * * *